(12) United States Patent
Yoshida et al.

(10) Patent No.: US 12,300,015 B2
(45) Date of Patent: May 13, 2025

(54) IMAGE PROCESSING APPARATUS, IMAGE PROCESSING METHOD, AND NON-TRANSITORY COMPUTER READABLE MEDIUM STORING IMAGE PROCESSING PROGRAM

(71) Applicant: NEC Corporation, Tokyo (JP)

(72) Inventors: Noboru Yoshida, Tokyo (JP); Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 422 days.

(21) Appl. No.: 17/769,793

(22) PCT Filed: Oct. 31, 2019

(86) PCT No.: PCT/JP2019/042746
§ 371 (c)(1),
(2) Date: Apr. 18, 2022

(87) PCT Pub. No.: WO2021/084677
PCT Pub. Date: May 6, 2021

(65) Prior Publication Data
US 2022/0383653 A1 Dec. 1, 2022

(51) Int. Cl.
*G06K 9/00* (2022.01)
*G06F 16/538* (2019.01)
(Continued)

(52) U.S. Cl.
CPC .......... *G06V 40/103* (2022.01); *G06F 16/538* (2019.01); *G06V 10/761* (2022.01); *G06V 10/764* (2022.01); *G06V 40/23* (2022.01)

(58) Field of Classification Search
CPC ........ G06K 9/00; G06T 13/40; G06V 40/107; G06V 40/10; A61B 34/10
(Continued)

(56) References Cited

U.S. PATENT DOCUMENTS

| | | | |
|---|---|---|---|
| 2011/0148875 A1* | 6/2011 | Kim | G06T 13/40 345/420 |
| 2013/0028517 A1* | 1/2013 | Yoo | G06V 40/107 382/173 |

(Continued)

FOREIGN PATENT DOCUMENTS

| | | |
|---|---|---|
| CN | 114641794 A | 6/2022 |
| JP | 2006-260405 A | 9/2006 |

(Continued)

OTHER PUBLICATIONS

Zhe Cao et al "Realtime Multi-Person 2D Pose Estimation using Part Affinity Fields", The IEEE Conference on Computer Vision and Pattern Recognition (CVPR) 2017. p. 7291-7299 (Year: 2017).*

(Continued)

*Primary Examiner* — Seyed H Azarian

(57) ABSTRACT

An image processing apparatus (10) according to the present disclosure includes: a skeleton detection unit (11) configured to detect two-dimensional skeleton structures of a plurality of persons based on an acquired two-dimensional image; a feature calculation unit (12) configured to calculate features of the plurality of two-dimensional skeleton structures that have been detected by the skeleton detection unit (11); and a recognition unit (13) configured to perform processing of recognizing states of the plurality of persons based on a degree of similarity among the plurality of features that have been calculated by the feature calculation unit (12).

18 Claims, 39 Drawing Sheets

(51) Int. Cl.
*G06V 10/74* (2022.01)
*G06V 10/764* (2022.01)
*G06V 40/10* (2022.01)
*G06V 40/20* (2022.01)

(58) Field of Classification Search
USPC ............. 382/100, 103, 106–107, 123, 128, 382/153–155, 162, 168, 173, 181, 194, 382/209, 219, 224, 254, 276, 285–291, 382/305, 312; 345/420, 419
See application file for complete search history.

(56) References Cited

U.S. PATENT DOCUMENTS

| | | | |
|---|---|---|---|
| 2013/0181988 | A1 | 7/2013 | Yoo et al. |
| 2013/0230211 | A1* | 9/2013 | Tanabiki ................... G06T 7/75 |
| | | | 382/103 |
| 2014/0301605 | A1* | 10/2014 | Kawaguchi ............. G06T 7/251 |
| | | | 382/103 |
| 2019/0147292 | A1 | 5/2019 | Watanabe et al. |
| 2020/0394393 | A1* | 12/2020 | Kraft ....................... G06V 40/28 |
| 2022/0108468 | A1* | 4/2022 | Nakamura ................ G06T 7/73 |
| 2024/0087353 | A1 | 3/2024 | Yoshida et al. |

FOREIGN PATENT DOCUMENTS

| | | |
|---|---|---|
| JP | 2012-120647 A | 6/2012 |
| JP | 2014-522035 A | 8/2014 |
| JP | 2018-073091 A | 5/2018 |
| JP | 2019-028509 A | 2/2019 |
| JP | 2019-091138 A | 6/2019 |
| TW | 201738827 A | 11/2017 |
| WO | 2019/048011 A1 | 3/2019 |

OTHER PUBLICATIONS

JP Office Communication for JP Application No. 2021-553977, mailed on Mar. 5, 2024 with English Translation.
International Search Report for PCT Application No. PCT/JP2019/042746, mailed on Dec. 3, 2019.
Zhe Cao et al., "Realtime Multi-Person 2D Pose Estimation using Part Affinity Fields". The IEEE Conference on Computer Vision and Pattern Recognition (CVPR), 2017, p. 7291-7299.
Extended European Search Report for EP Application No. 19951063.7, dated on Sep. 12, 2022.
India Office Action for IN Application No. 202217025223, mailed on Sep. 8, 2022 with English Translation.
CN Office Action for CN Application No. 201980101757.0, mailed on Mar. 3, 2025 with English Translation.

* cited by examiner

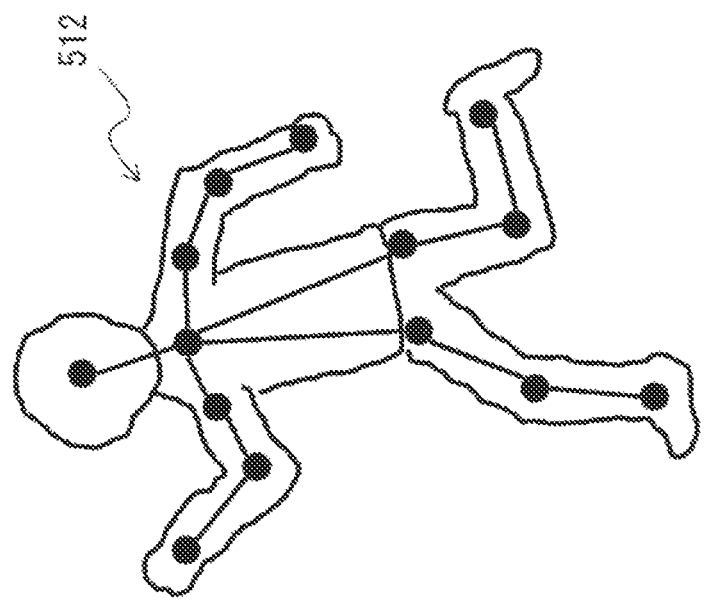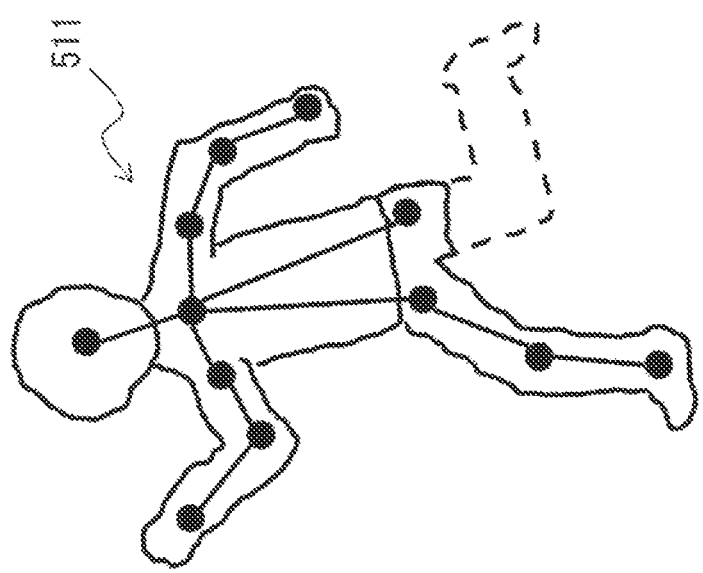
Fig. 14

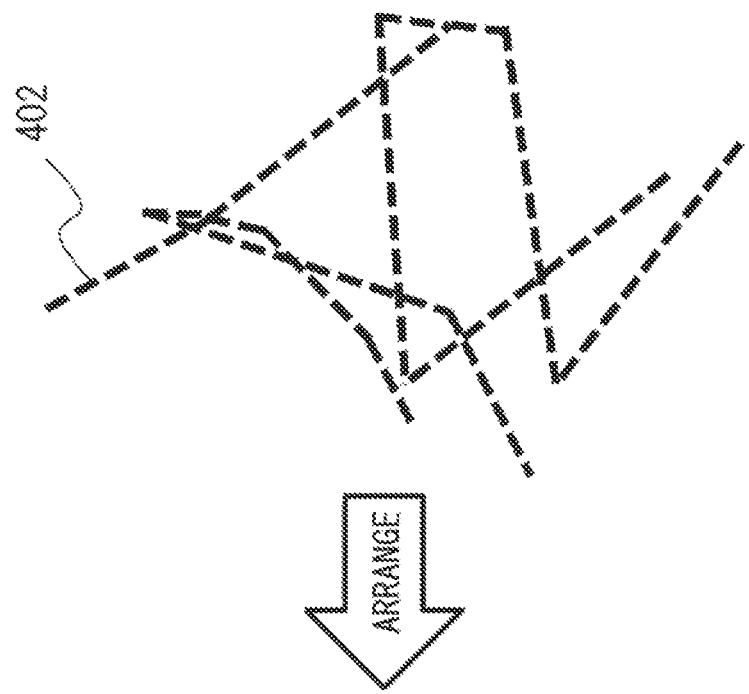
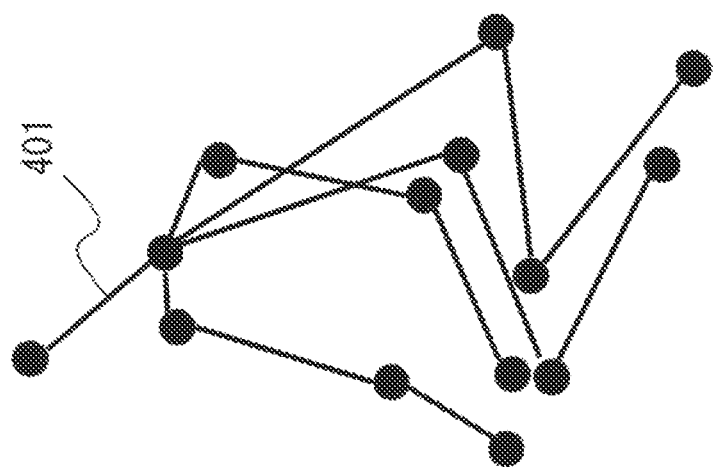
Fig. 33

IMAGE PROCESSING APPARATUS, IMAGE PROCESSING METHOD, AND NON-TRANSITORY COMPUTER READABLE MEDIUM STORING IMAGE PROCESSING PROGRAM

This application is a National Stage Entry of PCT/JP2019/042746 filed on Oct. 31, 2019, the contents of all of which are incorporated herein by reference, in their entirety.

TECHNICAL FIELD

The present invention relates to an image processing apparatus, an image processing method, and a non-transitory computer readable medium storing an image processing program.

BACKGROUND ART

In recent years, techniques for detecting and retrieving states such as a posture or behavior of a person from an image captured by a monitoring camera have been used in, for example, monitoring systems. For example, Patent Literature 1 and 2 are known as related art. Patent Literature 1 discloses a technique of retrieving, based on key joints such as the head, the hands, the feet and the like of a person included in a depth image, similar postures of persons. Patent Literature 2, which is not related to postures of a person, discloses a technique of retrieving similar images using posture information such as an inclination that is added to an image. Further, Non-Patent Literature 1 is known as a technique related to estimation of skeletons of persons.

CITATION LIST

Patent Literature

[Patent Literature 1] Published Japanese Translation of PCT International Publication for Patent Application, No. 2014-522035
[Patent Literature 2] Japanese Unexamined Patent Application Publication No. 2006-260405

Non Patent Literature

[Non-Patent Literature 1] Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, P. 7291-7299

SUMMARY OF INVENTION

Technical Problem

In the related art as disclosed in Patent Literature 1 stated above, similar postures of persons are retrieved based on the head, the hands, the feet and the like of the person. However, since it is assumed that the depth image is acquired, it is impossible to retrieve states such as postures from a two-dimensional image. Further, only retrieval from a specific viewpoint is taken into account. Therefore, there is a problem in the related art that it is difficult to perform state recognition processing such as retrieval, classification and the like of a state of a person based on the two-dimensional image in a flexible manner.

The present disclosure has been made in view of the aforementioned problem, and an object of the present disclosure is to provide an image processing apparatus, an image processing method, and a non-transitory computer readable medium storing an image processing program capable of performing state recognition processing of a person based on a two-dimensional image in a flexible manner.

Solution to Problem

An image processing apparatus according to the present disclosure includes: skeleton detection means for detecting two-dimensional skeleton structures of a plurality of persons based on an acquired two-dimensional image; feature calculation means for calculating features of the plurality of two-dimensional skeleton structures that have been detected; and recognition means for performing processing of recognizing states of the plurality of persons based on a degree of similarity among the plurality of features that have been calculated.

An image processing method according to the present disclosure includes: detecting two-dimensional skeleton structures of a plurality of persons based on an acquired two-dimensional image; calculating features of the plurality of two-dimensional skeleton structures that have been detected; and performing processing of recognizing states of the plurality of persons based on a degree of similarity among the plurality of features that have been calculated.

A non-transitory computer readable medium storing an image processing program according to the present disclosure causes a computer to execute processing of: detecting two-dimensional skeleton structures of a plurality of persons based on an acquired two-dimensional image; calculating features of the plurality of two-dimensional skeleton structures that have been detected; and performing processing of recognizing states of the plurality of persons based on a degree of similarity among the plurality of features that have been calculated.

Advantageous Effects of Invention

According to the present disclosure, it is possible to provide an image processing apparatus, an image processing method, and a non-transitory computer readable medium storing an image processing program capable of performing state recognition processing of a person based on a two-dimensional image in a flexible manner.

BRIEF DESCRIPTION OF DRAWINGS

FIG. 14 is a diagram for describing the retrieving method according to the first example embodiment;

FIG. 33 is a diagram for describing the body height pixel number calculation method according to the second example embodiment;

DESCRIPTION OF EMBODIMENTS

Hereinafter, with reference to the drawings, example embodiments will be described. Throughout the drawings, the same elements are denoted by the same reference symbols and duplicated descriptions will be omitted as necessary.

(Considerations Leading to Example Embodiments)

In recent years, image recognition techniques that use machine learning such as deep learning have been applied to various systems. For example, the image recognition techniques have been applied to monitoring systems that perform monitoring using images captured by a monitoring camera. By using machine learning in the monitoring systems, it is becoming possible to grasp the state such as a posture and behavior of a person from an image to some extent.

However, it is not always possible to grasp the state of a person whom the user wants to know on demand. There is a case, for example, in which the user can specify the states of a person whom the user wants to retrieve and know in advance or a case in which the user cannot specifically specify it, like unknown states. Then, in some cases, the state of a person the user wants to retrieve cannot be specified in detail. Further, when a part of the body of a person is hidden, retrieval and the like cannot be performed. In the related art, the state of a person can be retrieved only from specific retrieval conditions. In this case, it is difficult to retrieve and classify the states of desired persons in a flexible manner.

In order to solve the aforementioned problem, the inventors have discussed a method of using a skeleton estimation technique like the one disclosed in Non-Patent Literature 1 in order to recognize the state of a person whom the user wants to know from an image on demand. In related skeleton estimation technique like in OpenPose disclosed in Non-Patent Literature 1, skeletons of a person are estimated by learning various patterns of annotated image data. In the following example embodiments, the use of the skeleton estimation technique enables a state of a person to be recognized in a flexible manner.

Note that the skeleton structure estimated by the skeleton estimation technique such as OpenPose is formed of "key points", which are characteristic points such as joints and "bones (bone link)" indicating links between the key points. Therefore, while the skeleton structure will be described using the terms "key point" and "bone" in the following example embodiments, the "key point" corresponds to a "joint" of a person and the "bone" corresponds to a "bone" of the person unless otherwise limited.

Outline of Example Embodiments

Figure 1:
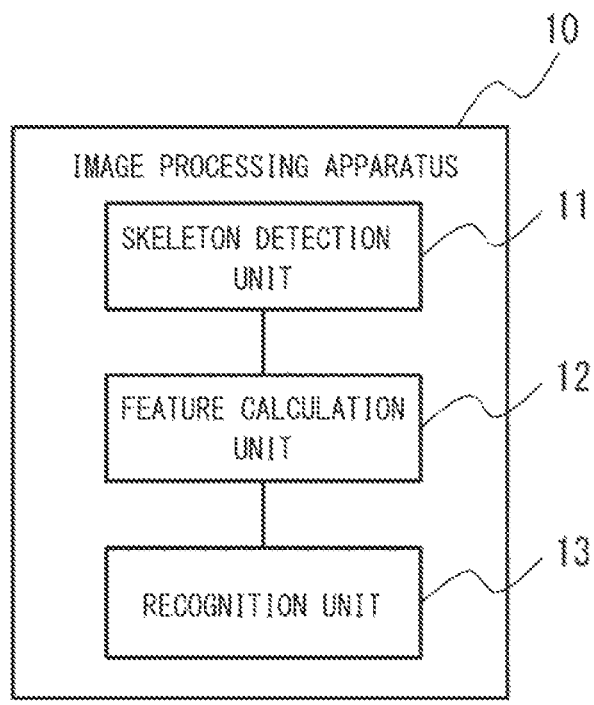
FIG. 1 is a configuration diagram showing an outline of an image processing apparatus according to an example embodiment.

FIG. 1 shows an outline of an image processing apparatus 10 according to an example embodiment. As shown in FIG. 1, the image processing apparatus 10 includes a skeleton detection unit 11, a feature calculation unit 12, and a recognition unit 13. The skeleton detection unit 11 detects two-dimensional skeleton structures of a plurality of persons based on a two-dimensional image acquired by a camera or the like. The feature calculation unit 12 calculates features of the plurality of two-dimensional skeleton structures detected by the skeleton detection unit 11. The recognition unit 13 performs processing of recognizing states of a plurality of persons based on a degree of similarity among the plurality of features calculated by the feature calculation unit 12. The recognition processing is, for example, processing of classifying or retrieving states of a person.

As described above, in this example embodiment, the two-dimensional skeleton structure of the person is detected from the two-dimensional image and recognition processing such as classification and examination of states of a person may be performed based on the features calculated from this two-dimensional skeleton structure, whereby it is possible to recognize states of desired persons in a flexible manner.

First Example Embodiment

Figure 2:
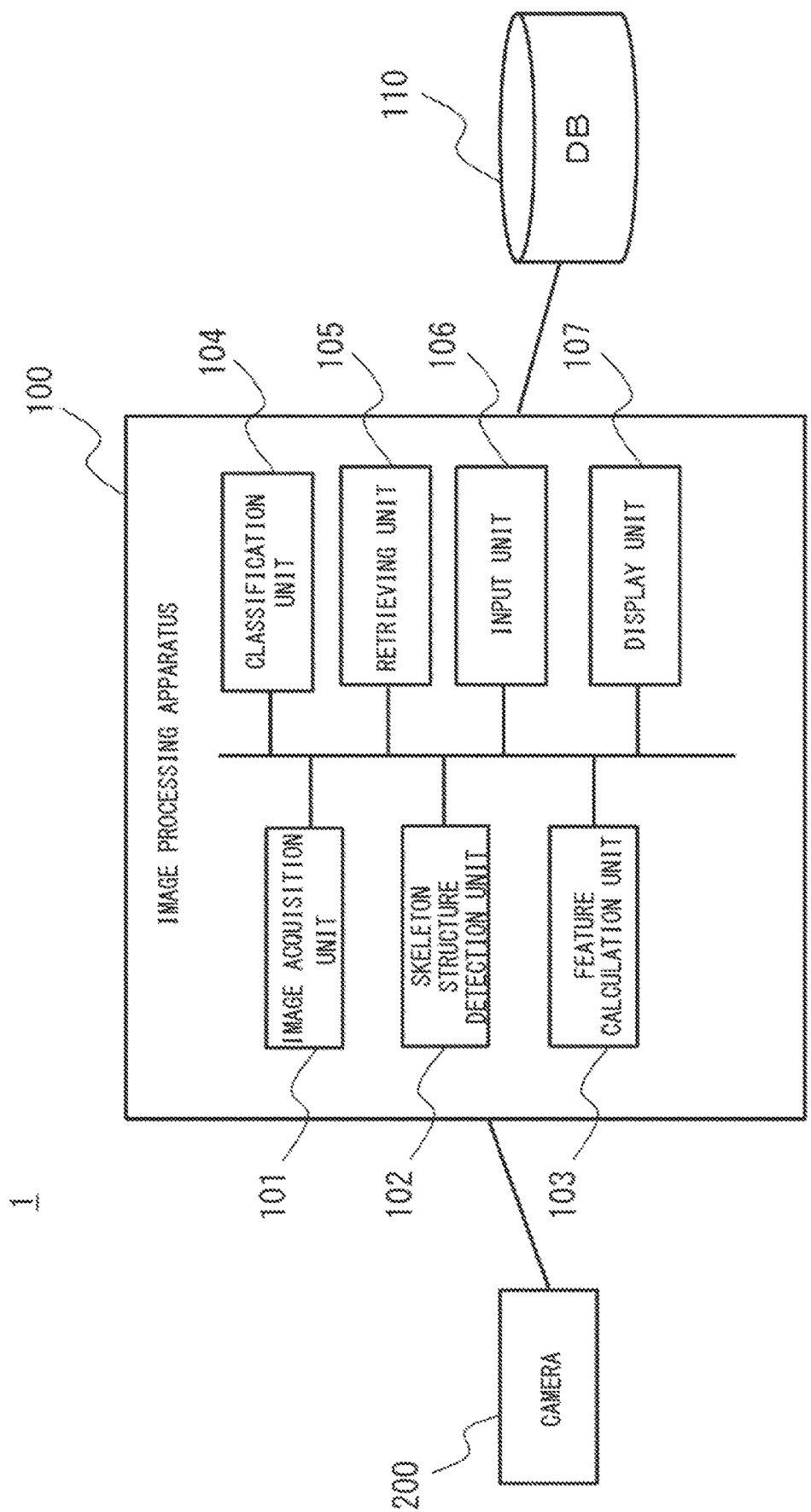
FIG. 2 is a configuration diagram showing a configuration of an image processing apparatus according to a first example embodiment.

Hereinafter, with reference to the drawings, a first example embodiment will be described. FIG. 2 shows a configuration of an image processing apparatus 100 according to this example embodiment. The image processing apparatus 100 forms an image processing system 1 along with a camera 200 and a database (DB) 110. The image processing system 1 including the image processing apparatus 100 is a system for classifying and retrieving states such as postures or behavior of persons based on skeleton structures of the persons estimated from images.

The camera 200 is an image-capturing unit such as a monitoring camera that generates two-dimensional images. The camera 200 is installed in a predetermined place and captures images of persons or the like in the imaging area from the place where it is installed. The camera 200 is directly connected to the image processing apparatus 100 or is connected thereto via a network or the like in such a way that it can output the captured images (video images) to the image processing apparatus 100. Note that the camera 200 may be provided inside the image processing apparatus 100.

The database 110 is a database that stores information (data) necessary for processing of the image processing apparatus 100, results of processing in the image processing apparatus 100 and the like. The database 110 stores images acquired by an image acquisition unit 101, results of detection by a skeleton structure detection unit 102, data for machine learning, features normalized by a feature calculation unit 103, results of classification in a classification unit 104, results of retrieval in a retrieving unit 105, and the like. The database 110 is directly connected to the image processing apparatus 100 or is connected thereto via a network or the like in such a way that the database 110 is able to input and output data to and from the image processing apparatus 100 as necessary. The database 110 may be provided inside the image processing apparatus 100 as a nonvolatile memory such as a flash memory or a hard disk apparatus.

As shown in FIG. 2, the image processing apparatus 100 includes the image acquisition unit 101, the skeleton structure detection unit 102, the feature calculation unit 103, the classification unit 104, the retrieving unit 105, an input unit 106, and a display unit 107. Note that the configuration of each part (block) is merely one example and they may be formed of other parts if a method (operation) described later is available. Further, while the image processing apparatus 100 is implemented by, for example, a computer apparatus such as a server or a personal computer that executes a program, it may be implemented by one apparatus or may be implemented by a plurality of apparatuses on a network. For example, the input unit 106, the display unit 107 and the like may be external apparatuses. Further, both the classification unit 104 and the retrieving unit 105 may be included or one of them may be included. One or both of the classification unit 104 and the retrieving unit 105 is a recognition unit that performs processing of recognizing the state of a person.

The image acquisition unit 101 acquires two-dimensional images including persons captured by the camera 200. The image acquisition unit 101 acquires, for example, images including the persons (video image including a plurality of images) captured by the camera 200 in a predetermined monitoring period. The image acquisition unit 101 may not necessarily acquire images from the camera 200 and may acquire images including persons prepared in advance from the database 110 or the like.

The skeleton structure detection unit 102 detects a two-dimensional skeleton structure of a person in the image based on the acquired two-dimensional images. The skeleton structure detection unit 102 detects the skeleton structure for all the persons recognized in the acquired images. The skeleton structure detection unit 102 detects, using the skeleton estimation technique that uses machine learning, the skeleton structure of the person based on features of joints or the like of the person that is recognized. The skeleton structure detection unit 102 uses, for example, the skeleton estimation technique such as OpenPose disclosed in Non-Patent Literature 1.

The feature calculation unit 103 calculates features of the two-dimensional skeleton structure that has been detected and stores the calculated features in the database 110. The features of the skeleton structure, which indicate features of the skeletons of a person, are elements for classifying and retrieving states of the person based on the skeletons of the person. The features may be all or some of the features of the skeleton structures or may include a plurality of features such as each part of the skeleton structure. The method of calculating the features may be a desired method such as machine learning or normalization, and a minimum value or a maximum value may be obtained as normalization. As one example, the features are features obtained by performing machine learning on a skeleton structure, the size on the image from the head part to the foot part of the skeleton structure, or the like. The size of the skeleton structure is the height, the area or the like of the up-down direction of the skeletal area including the skeleton structure on the image. The up-down direction (the height direction or the vertical direction), which is the up-down direction (Y-axis direction) in the image, is, for example, the direction vertical to the ground (reference plane). Further, the right-left direction (horizontal direction), which is the right-left direction (X-axis direction) on the image, is, for example, a direction parallel to the ground.

In order to perform classification and retrieval that the user desires, features having robustness against processing of classification and retrieval are preferably used. When, for example, the user desires classification and retrieval that do not depend on the orientation and the body shape of the person, features that are robust against the orientation or the body shape of the person may be used. By learning skeletons of persons facing various directions in the same posture or skeletons of persons of various body shapes in the same posture or extracting features of only the up-down direction of skeletons, features that do not depend on the orientation or the body shape of the person can be obtained.

The classification unit 104 classifies (clusters) a plurality of skeleton structures stored in the database 110 based on a degree of similarity among the features of the skeleton structures. It can also be said that the classification unit 104 classifies states of a plurality of persons based on the features of the skeleton structures as processing of recognizing the states of the persons. The degree of similarity is a distance between features of the skeleton structures. The classification unit 104 may classify the skeleton structures by the degree of similarity of the entire features of the skeleton structures, by the degree of similarity of some of the features of the skeleton structures, or by the degree of similarity between features of a first part (e.g., both hands) and a second part (e.g., both feet) of the skeleton structures. Note that the postures of the person may be classified based on features of the skeleton structures of the person in each image or behavior of the person may be classified based on a change in the features of the skeleton structures of a person in a plurality of images that are continuous in time series. That is, the classification unit 104 is able to classify states of a person including postures and behavior of the person based on the features of the skeleton structures.

For example, the classification unit 104 classifies a plurality of skeleton structures in a plurality of images captured in a predetermined monitoring period. The classification unit 104 obtains the degree of similarity among features of the target to be classified and classifies the skeleton structures in such a way that skeleton structures having a high degree of similarity are classified into the same cluster (so that a group of similar postures can be obtained). Like in the retrieval, a classification condition may be specified by the user. The classification unit 104 stores results of classifying skeleton structures in the database 110 and displays these results on the display unit 107.

The retrieving unit 105 retrieves a skeleton structure having a high degree of similarity with features of a retrieval query (query state) from among the plurality of skeleton structures stored in the database 110. It can also be said that the retrieving unit 105 retrieves, as processing of recognizing states of the person, the state of the person that corresponds to the retrieval condition (query state) from among the states of a plurality of persons based on the features of the skeleton structures. Like in the classification, the degree of similarity is a distance between features of the skeleton structures. The retrieving unit 105 may retrieve the skeleton structures by the degree of similarity among all the features of the skeleton structures, retrieve the skeleton structures by the degree of similarity among some features of the skeleton structures, or may retrieve the skeleton structures by the degree of similarity between features of a first part (e.g., both hands) and features of a second part (e.g., both feet) of the skeleton structure. Note that the postures of the person may be retrieved based on the features of the skeleton structures of the person in each image or behavior of the person may be retrieved based on a change in the features of the skeleton structures of the person in a plurality of images that are continuous in time series. That is, the retrieving unit 105 is able to retrieve the states of a person including postures and behavior of the person based on the features of the skeleton structures.

For example, the retrieving unit 105 retrieves features of the plurality of skeleton structures in a plurality of images captured in a predetermined monitoring period, like in the processing of determining the classification target. Further, a skeleton structure (posture) that the user has specified from among the results of classification displayed by the classification unit 104 is used as a retrieval query (retrieval key). Note that the retrieval query is not limited to be selected from the results of classification and the retrieval query may be selected from among a plurality of skeleton structures that have not been classified or the skeleton structure, which is the retrieval query, may be input by the user. The retrieving unit 105 retrieves features having a high degree of similarity with the features of the skeleton structures of the retrieval query from among the features to be retrieved. The retrieving unit 105 stores the results of retrieval of the features in the database 110 and causes the display unit 107 to display them.

The input unit 106 is an input interface that acquires information input from the user who operates the image processing apparatus 100. The user is, for example, an observer who monitors a suspicious person from images captured by a monitoring camera. The input unit 106, which is, for example, a Graphical User Interface (GUI), receives information in accordance with a user's operation from an input apparatus such as a keyboard, a mouse, or a touch panel. For example, the input unit 106 accepts the skeleton structure of the specified person from among the skeleton structures (postures) classified by the classification unit 104 as a retrieval query.

The display unit 107, which displays results of an operation (processing) by the image processing apparatus 100, is, for example, a display apparatus such as a liquid crystal display or an organic Electro Luminescence (EL) display. The display unit 107 displays the results of classification in the classification unit 104 and the results of retrieval in the retrieving unit 105 on the GUI in accordance with the degree of similarity or the like.

Figure 3:
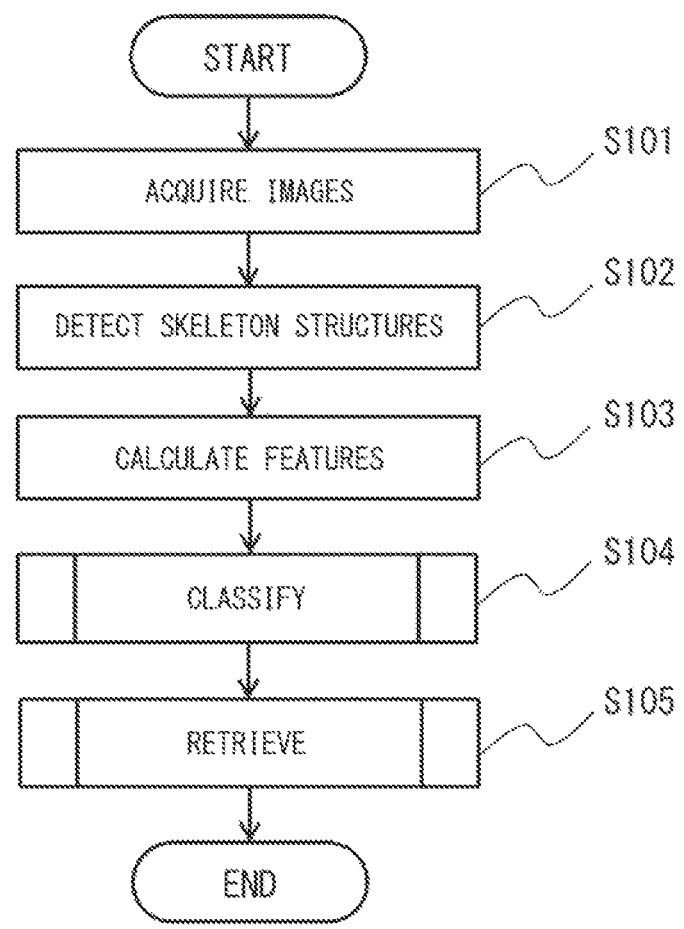
FIG. 3 is a flowchart showing an image processing method according to the first example embodiment.
Figure 4:
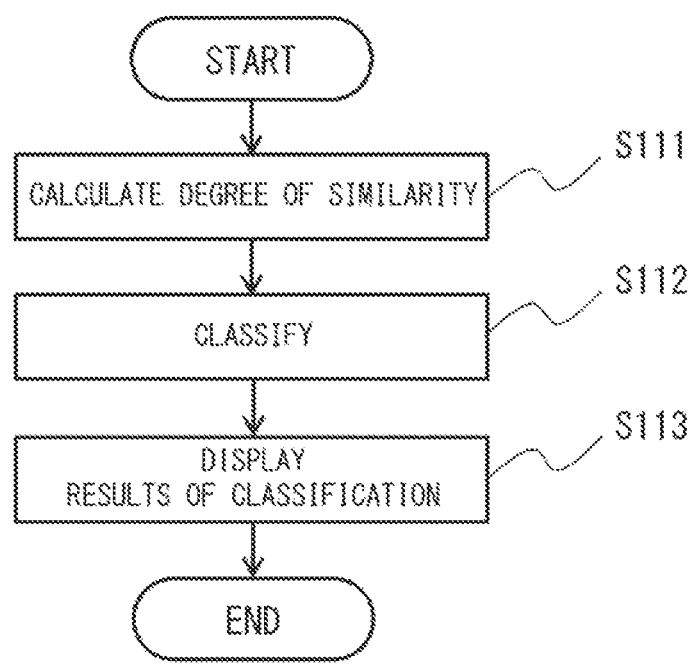
FIG. 4 is a flowchart showing a classification method according to the first example embodiment.
Figure 5:
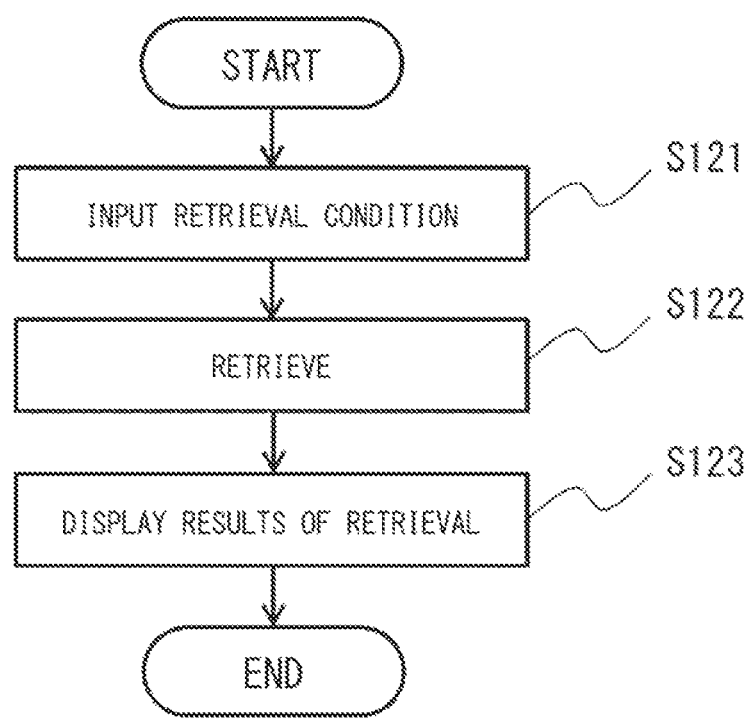
FIG. 5 is a flowchart showing a retrieving method according to the first example embodiment.

FIGS. 3-5 each show an operation of the image processing apparatus 100 according to this example embodiment. FIG. 3 shows a flow in the image processing apparatus 100 from image acquisition to retrieving processing, FIG. 4 shows a flow of classification processing (S104) in FIG. 3, and FIG. 5 shows a flow of retrieving processing (S105) in FIG. 3.

As shown in FIG. 3, the image processing apparatus 100 acquires images from the camera 200 (S101). The image acquisition unit 101 acquires images of a person in order to perform classification and retrieval from a skeleton structure and stores the acquired images in the database 110. The image acquisition unit 101 acquires, for example, a plurality of images captured in a predetermined monitoring period and performs the following processing for all the persons included in the plurality of images.

Figure 6:
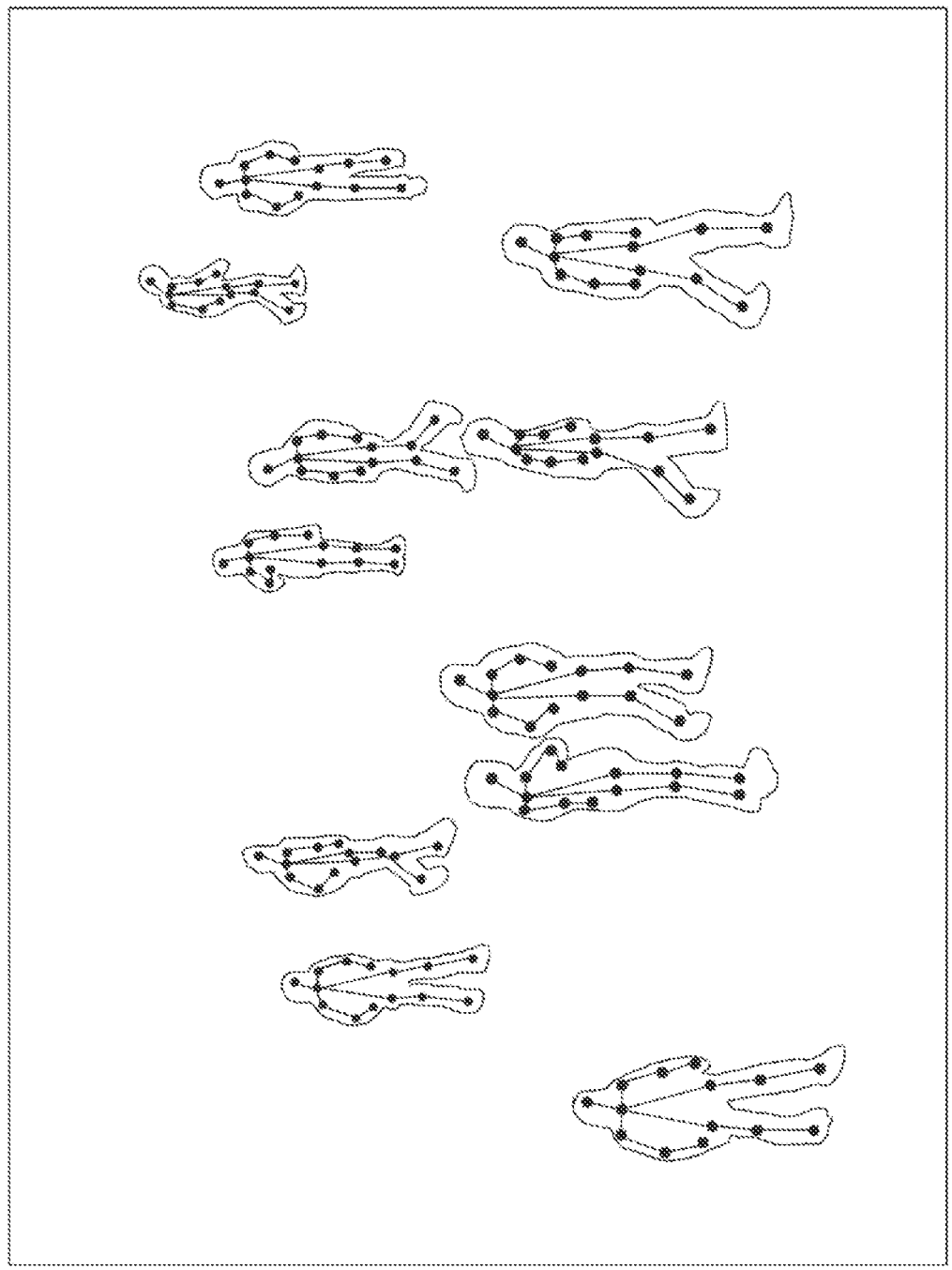
FIG. 6 is a diagram showing an example of detecting a skeleton structure according to the first example embodiment.

Next, the image processing apparatus 100 detects skeleton structures of persons based on the images of the persons that have been acquired (S102). FIG. 6 shows an example of detecting skeleton structures. As shown in FIG. 6, the image captured from a monitoring camera or the like includes a plurality of persons and the skeleton structure is detected for each person included in the image.

Figure 7:
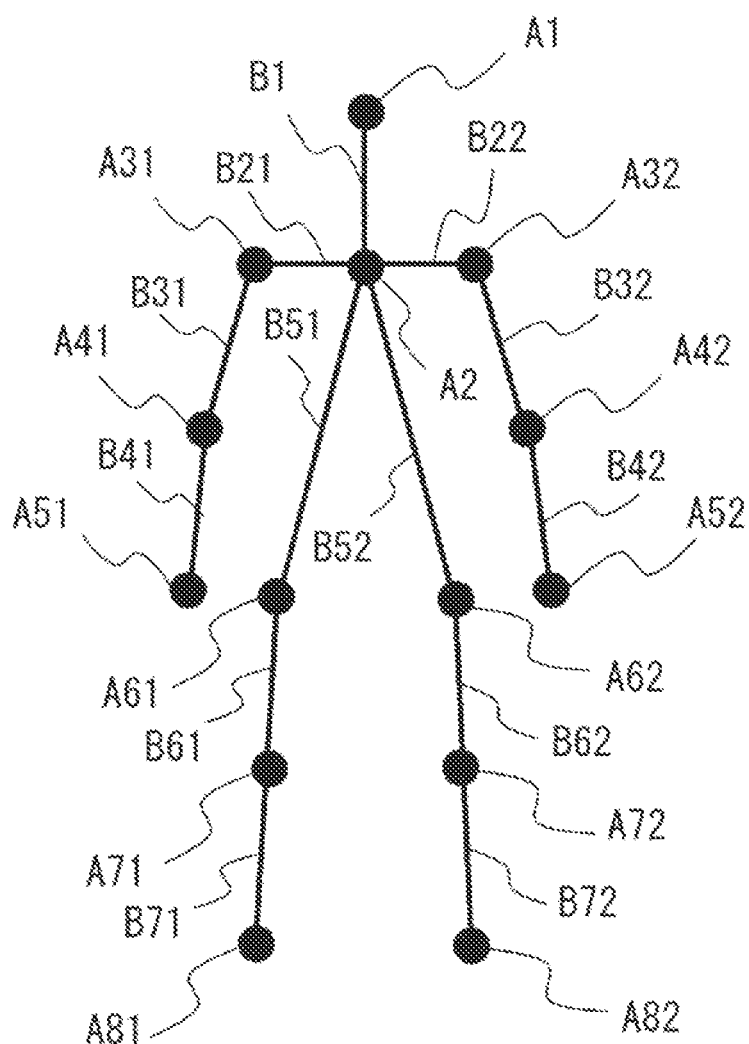
FIG. 7 is a diagram showing a human body model according to the first example embodiment.
Figure 8:
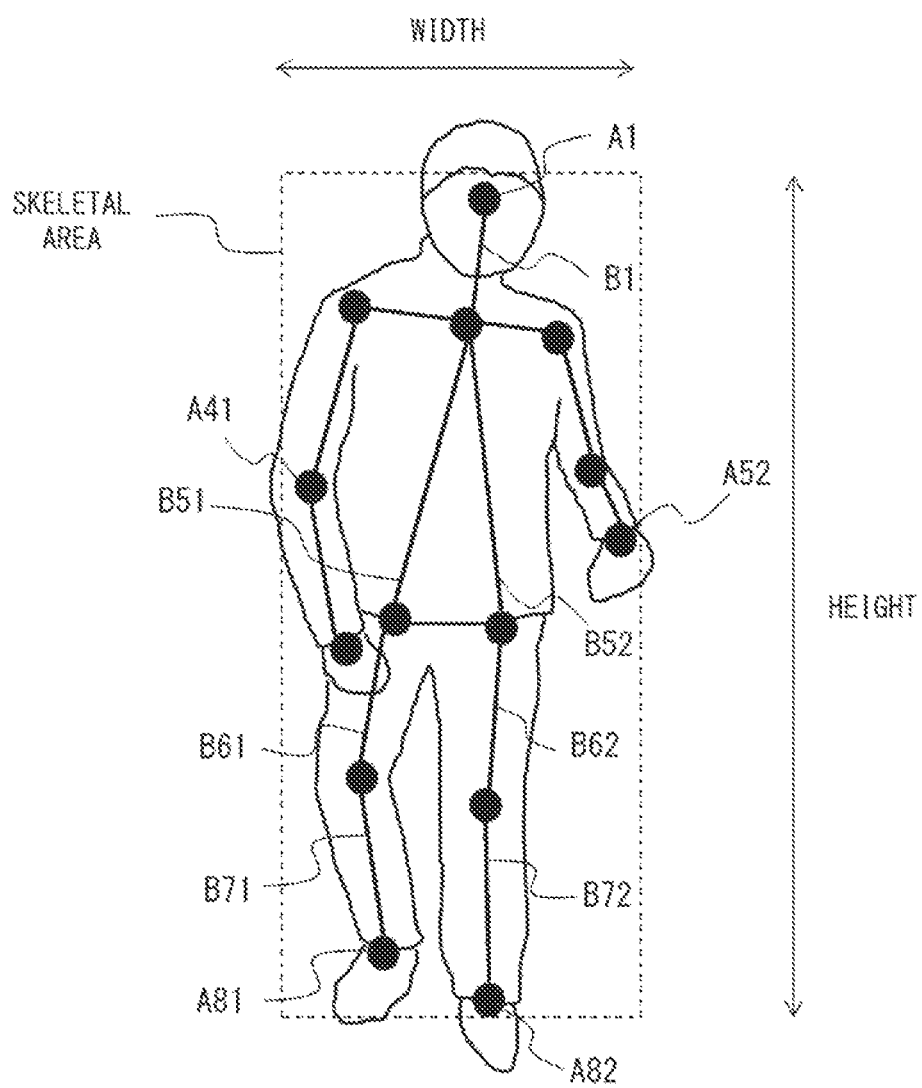
FIG. 8 is a diagram showing an example of detecting the skeleton structure according to the first example embodiment.
Figure 9:
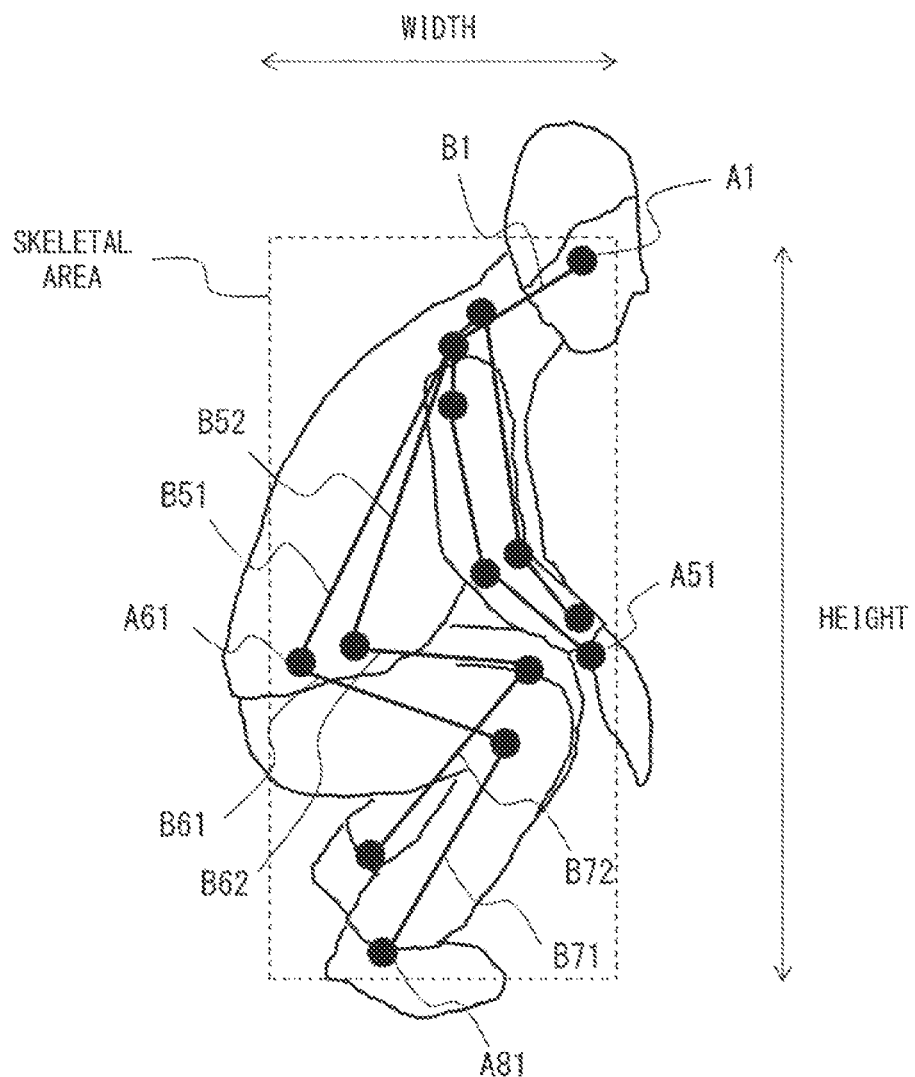
FIG. 9 is a diagram showing an example of detecting the skeleton structure according to the first example embodiment.
Figure 10:
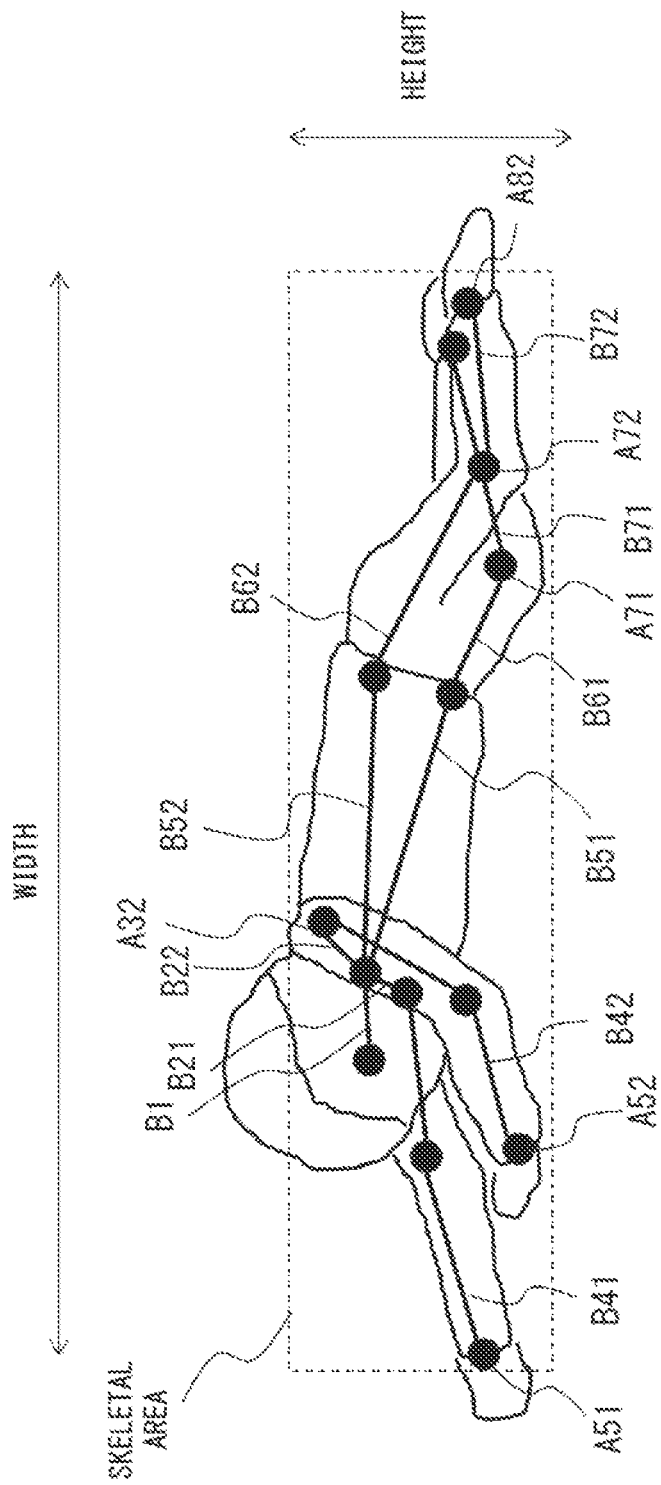
FIG. 10 is a diagram showing an example of detecting the skeleton structure according to the first example embodiment.

FIG. 7 shows a skeleton structure of a human body model 300 detected at this time and FIGS. 8-10 show examples of detecting the skeleton structures. The skeleton structure detection unit 102 detects the skeleton structure of the human body model (two-dimensional skeleton model) 300 as shown in FIG. 7 from the two-dimensional image using the skeleton estimation technique such as OpenPose. The human body model 300 is a two-dimensional model composed of key points such as joints of the person and bones connecting the key points.

The skeleton structure detection unit 102 extracts, for example, feature points that may become key points from the image, refers to information obtained by performing machine learning of the image of the key points, and detects each key point of the person. In the example shown in FIG. 7, a head A1, a neck A2, a right shoulder A31, a left shoulder A32, a right elbow A41, a left elbow A42, a right hand A51, a left hand A52, a right waist A61, a left waist A62, a right knee A71, a left knee A72, a right foot A81, and a left foot A82 are detected as key points of the person. Further, as bones of the person connecting these key points, a bone B1 connecting the head A1 and the neck A2, a bone B21 connecting the neck A2 and the right shoulder A31 and a bone B22 connecting the neck A2 and the left shoulder A32, a bone B31 connecting the right shoulder A31 and the right elbow A41 and a bone B32 connecting the left shoulder A32 and the left elbow A42, a bone B41 connecting the right elbow A41 and the right hand A51 and a bone B42 connecting the left elbow A42 and the left hand A52, a bone B51 connecting the neck A2 and the right waist A61 and a bone B52 connecting the neck A2 and the left waist A62, a bone B61 connecting the right waist A61 and the right knee A71 and a bone B62 connecting the left waist A62 and the left knee A72, and a bone B71 connecting the right knee A71 and the right foot A81 and a bone B72 connecting the left knee A72 and the left foot A82 are detected. The skeleton structure detection unit 102 stores the skeleton structures of the detected person in the database 110.

FIG. 8 is an example of detecting a person who is standing upright. In FIG. 8, an image of the person who is standing upright is captured from the front, the bone B1, the bone B51 and the bone B52, the bone B61 and the bone B62, and the bone B71 and the bone B72 seen from the front are detected without overlapping each other, and the bones B61 and B71 of the right leg are bent slightly more than the bones B62 and B72 of the left leg are.

FIG. 9 is an example of detecting a crouching person. In FIG. 9, an image of the crouching person is captured from the right side, the bone B1, the bone B51 and the bone B52, the bone B61 and the bone B62, the bone B71 and the bone B72 seen from the right side are each detected, and the bones B61 and B71 of the right leg and the bones B62 and B72 of the left leg are greatly bent and overlap each other.

FIG. 10 is an example of detecting a person who is lying down. In FIG. 10, an image of the person who is lying down is captured from the diagonally forward left, the bone B1, the bone B51 and the bone B52, the bone B61 and the bone B62, and the bone B71 and the bone B72 seen from the diagonally forward left are each captured, and the bones B61 and B71 of the right leg and the bones B62 and B72 of the left leg are bent and overlap each other.

Next, as shown in FIG. 3, the image processing apparatus 100 calculates features of the skeleton structure that has been detected (S103). When, for example, the height and the skeletal area are features, the feature calculation unit 103 extracts an area including the skeleton structure and obtains the height (number of pixels) and the area (pixel area) of the above area. The height and the skeletal area are obtained from coordinates of end parts of the extracted skeletal area and coordinates of the key points of the end parts. The feature calculation unit 103 stores the obtained features of the skeleton structure in the database 110.

In the example shown in FIG. 8, the skeletal area including all the bones is extracted from the skeleton structure of the person who is standing upright. In this case, the upper end of the skeletal area is the key point of the head part A1, the lower end of the skeletal area is the key point of the left foot A82, the left end of the skeletal area is the key point of the right elbow A41, and the right end of the skeletal area is the key point of the left hand A52. Therefore, the height of the skeletal area is obtained from the difference between the Y-coordinate of the key point A1 and the Y-coordinate of the key point A82. Further, the width of the skeletal area is obtained from the difference between the X-coordinate of the key point A41 and the X-coordinate of the key point A52 and the size of the skeletal area is obtained from the height and the width of the skeletal area.

In the example shown in FIG. 9, the skeletal area including all the bones is extracted from the skeleton structure of a crouching person. In this case, the upper end of the skeletal area is the key point of the head part A1, the lower end of the skeletal area is the key point of the right foot A81, the left end of the skeletal area is the key point of the right waist A61, and the right end of the skeletal area is the key point of the right hand A51. Therefore, the height of the skeletal area is obtained from the difference between the Y-coordinate of the key point A1 and the Y-coordinate of the key point A81. Further, the width of the skeletal area is obtained from the difference between the X-coordinate of the key point A61 and the X-coordinate of the key point A51 and the size of the skeletal area is obtained from the height and the width of the skeletal area.

In the example shown in FIG. 10, the skeletal area including all the bones is extracted from the skeleton structure of a person who is lying down in the right-left direction of the image. In this case, the upper end of the skeletal area is the key point of the left shoulder A32, the lower end of the skeletal area is the key point of the left hand A52, the left end of the skeletal area is the key point of the right hand A51, and the right end of the skeletal area is the key point of the left foot A82. Therefore, the height of the skeletal area is obtained from the difference between the Y-coordinate of the key point A32 and the Y-coordinate of the key point A52. Further, the width of the skeletal area is obtained from the difference between the X-coordinate of the key point A51 and the X-coordinate of the key point A82 and the size of the skeletal area is obtained from the height and the width of the skeletal area.

Figure 11:
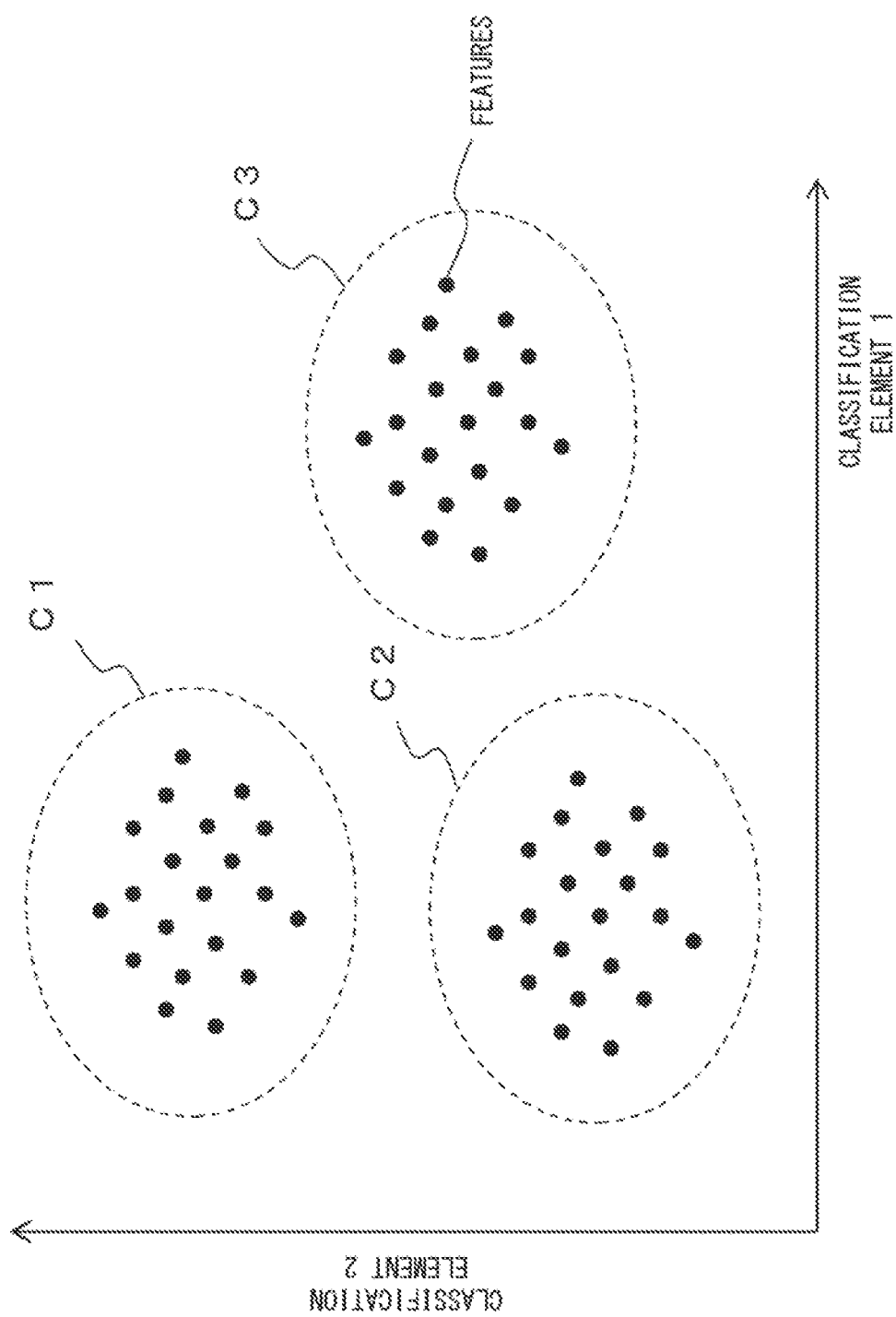
FIG. 11 is a graph showing a specific example of a classification method according to the first example embodiment.

Next, as shown in FIG. 3, the image processing apparatus 100 performs classification processing (S104). In the classification processing, as shown in FIG. 4, the classification unit 104 calculates the degree of similarity of the features of the skeleton structures that have been calculated (S111) and classifies skeleton structures based on the calculated features (S112). The classification unit 104 obtains the degree of similarity among features of all the skeleton structures that are stored in the database 110 and are to be classified, and classifies (clusters) skeleton structures (postures) whose degree of similarity is the largest into one cluster. Further, the classification unit 104 classifies the skeleton structures (postures) by obtaining the degree of similarity among the classified clusters and repeats the classification until the number of clusters reaches a predetermined number of clusters. FIG. 11 shows an image of results of classification of features of skeleton structures. FIG. 11 is an image of analysis of clusters by two-dimensional classification elements, and the two classification elements are, for example, the height of the skeletal area and the size of the skeletal area. In FIG. 11, as a result of classification, features of a plurality of skeleton structures are classified into three clusters C1-C3. The clusters C1-C3 correspond to, for example, the respective postures such as a standing posture, a sitting posture, and a lying posture, and skeleton structures (persons) are classified by similar postures.

In this example embodiment, the skeleton structures are classified based on features of the skeleton structures of a person, whereby various classification methods may be used. Note that the classification method may be set in advance or may be set by the user in a desired manner. Further, the classification may be performed by a method the same as a retrieving method that will be described later. That is, the skeleton structures may be classified by a classification condition similar to a retrieval condition. For example, the classification unit 104 performs classification by the following classification method. One of the classification methods may be used or classification methods selected in a desired manner may be combined with each other.

(Classification Method 1) Classification by Plurality of Hierarchies

The skeleton structures are classified by combining classification by the skeleton structure of the whole body, classification by the skeleton structure of the upper body and the lower body, classification by the skeleton structure of arms and legs in a hierarchical way. That is, the skeleton structures may be classified based on features of a first part and features of a second part of the skeleton structure, and further the skeleton structures may be classified by applying a weight to the features of the first part and the features of the second part.

(Classification Method 2) Classification by Plurality of Images Along Time Series The skeleton structures are classified based on features of the skeleton structures in a plurality of images that are continuous in time series. For example, the features may be accumulated in the time-series direction and the skeleton structures may be classified based on the accumulated value. Further, the skeleton structures may be classified based on a change (change amount) in the features of the skeleton structures in a plurality of continuous images.

(Classification Method 3) Classification Regardless of Right and Left of Skeleton Structures Skeleton structures in which the right side and the left side of a person are opposite from each other are classified as the same skeleton structure.

Figure 12:
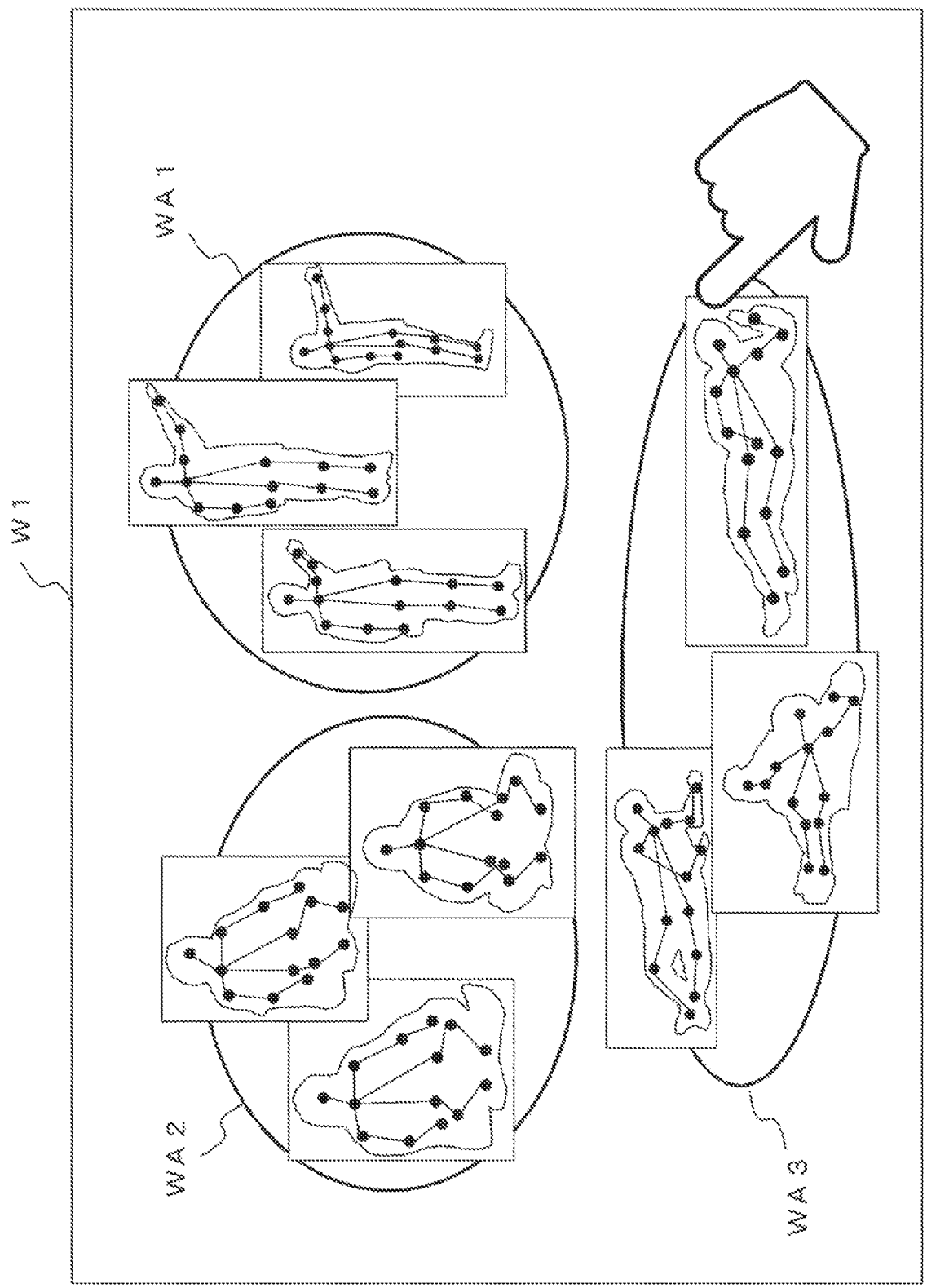
FIG. 12 is a diagram showing an example of displaying results of classification according to the first example embodiment.

Further, the classification unit 104 displays results of classifying skeleton structures (S113). The classification unit 104 acquires images of skeleton structures and persons that are necessary from the database 110 and displays the skeleton structures and persons on the display unit 107 for each of similar postures (clusters) as results of classification. FIG. 12 shows a display example in a case in which postures are classified into three. For example, as shown in FIG. 12, posture areas WA1-WA3 for the respective postures are displayed on a display window W1 and the skeleton structures and the persons (images) of the respective corresponding postures are displayed in the posture areas WA1-WA3. The posture area WA1, which is, for example, a display area of the standing posture, displays skeleton structures similar to the standing posture and corresponding persons classified into the cluster C1. The posture area WA2, which is, for example, a display area of the sitting posture, displays skeleton structures similar to the sitting posture and corresponding persons classified into the cluster C2. The posture area WA3, which is, for example, a display area of the lying posture, displays skeleton structures similar to the lying posture and corresponding persons classified into the cluster C2.

Next, as shown in FIG. 3, the image processing apparatus 100 performs retrieving processing (S105). In the retrieving processing, as shown in FIG. 5, the retrieving unit 105 accepts an input of a retrieval condition (S121) and retrieves a skeleton structure based on the retrieval condition (S122). The retrieving unit 105 accepts, from the input unit 106, the input of the retrieval query, which is a retrieval condition, in accordance with a user's operation. When the retrieval query is input from the results of classification, in the display example shown in FIG. 12, for example, the user specifies (selects) the skeleton structure of the posture to be retrieved from among the posture areas WA1-WA3 displayed on the display window W1. Then, the retrieving unit 105 retrieves, using the skeleton structure specified by the user as the retrieval query, a skeleton structure having features having a high degree of similarity from among all the skeleton structures stored in the database 110 to be retrieved. The retrieving unit 105 calculates the degree of similarity among the features of the skeleton structures of the retrieval query and the features of the skeleton structures to be retrieved and extracts a skeleton structure whose calculated degree of similarity is higher than a predetermined threshold. The features of the skeleton structures of the retrieval query may use the features calculated in advance or may use features obtained at the time of retrieval. Note that the retrieval query may be input by moving each part of the skeleton structure in accordance with a user's operation or may use the posture demonstrated by the user in front of the camera as a retrieval query.

In this example embodiment, like in the classification method, skeleton structures are retrieved based on features of the skeleton structures of the person, whereby various retrieving methods may be used. Note that the retrieving method may be set in advance or may be set by the user in a desired manner. For example, the retrieving unit 105 retrieves the skeleton structures by the following retrieving method. One of the retrieving methods may be used or retrieving methods selected in a desired manner may be combined with each other. The skeleton structures may be retrieved by combining a plurality of retrieving methods (retrieval conditions) by a logical expression (e.g., AND (logical AND), OR (logical OR), or NOT (negative)). For example, the retrieval condition may be "(a posture in which a person is raising his/her right hand) AND (a posture in which a person is raising his/her left leg)".

(Retrieving Method 1) Retrieval Only by Features of Height Direction

Figure 13:
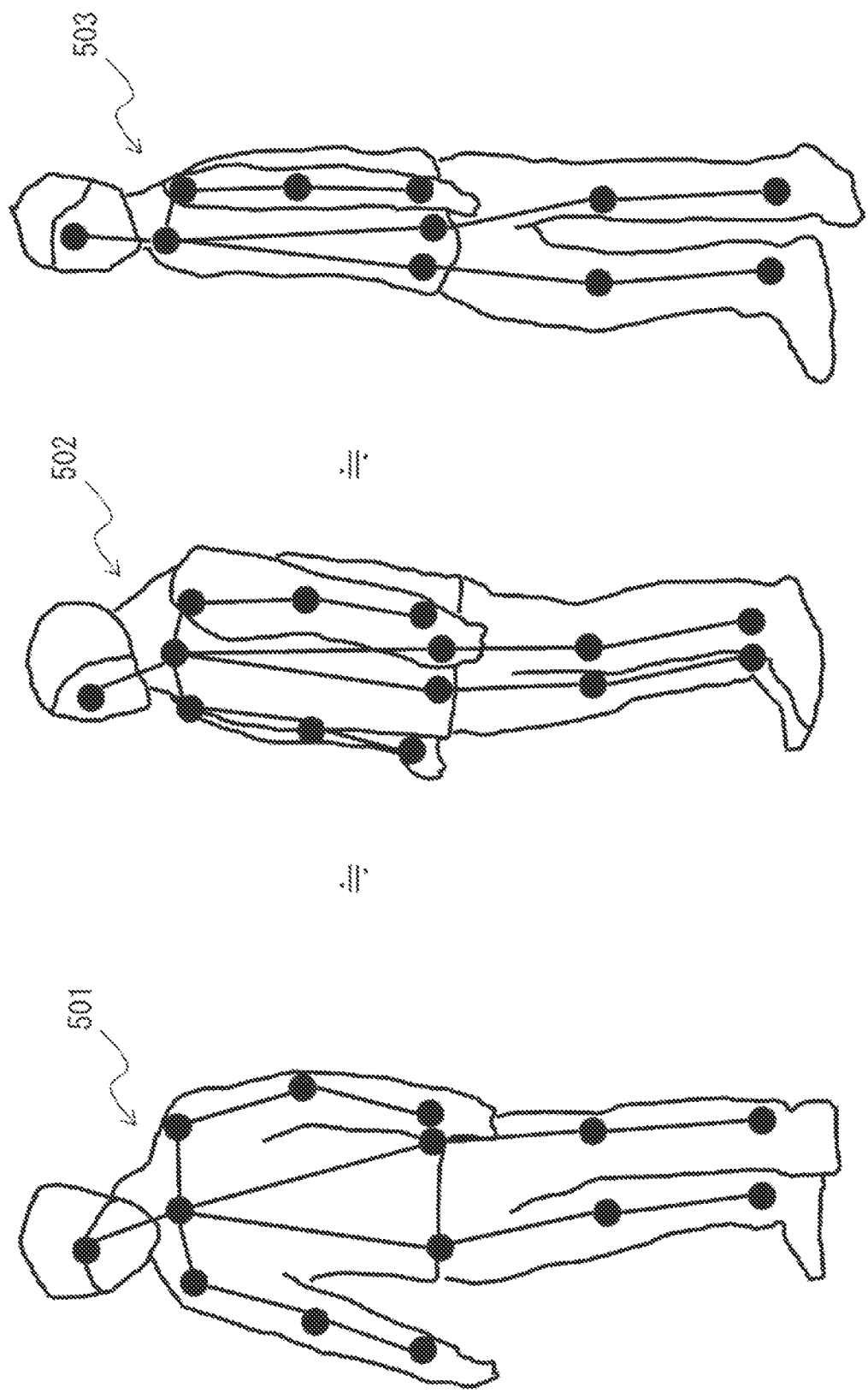
FIG. 13 is a diagram for describing the retrieving method according to the first example embodiment.

By retrieving the skeleton structures using only features of a height direction of a person, an influence of a change in the horizontal direction of the person can be prevented, and robustness against a change in the orientation of the person and the body shape of the person is improved. For example, even when the orientation and the body shape of the person are different from each other such as in skeleton structures 501-503 in FIG. 13, the features of the height direction are not greatly changed. Therefore, it can be determined that the skeleton structures 501-503 are the same posture at the time of retrieval (classification).

(Retrieving Method 2) Partial Retrieval

Figure 15:
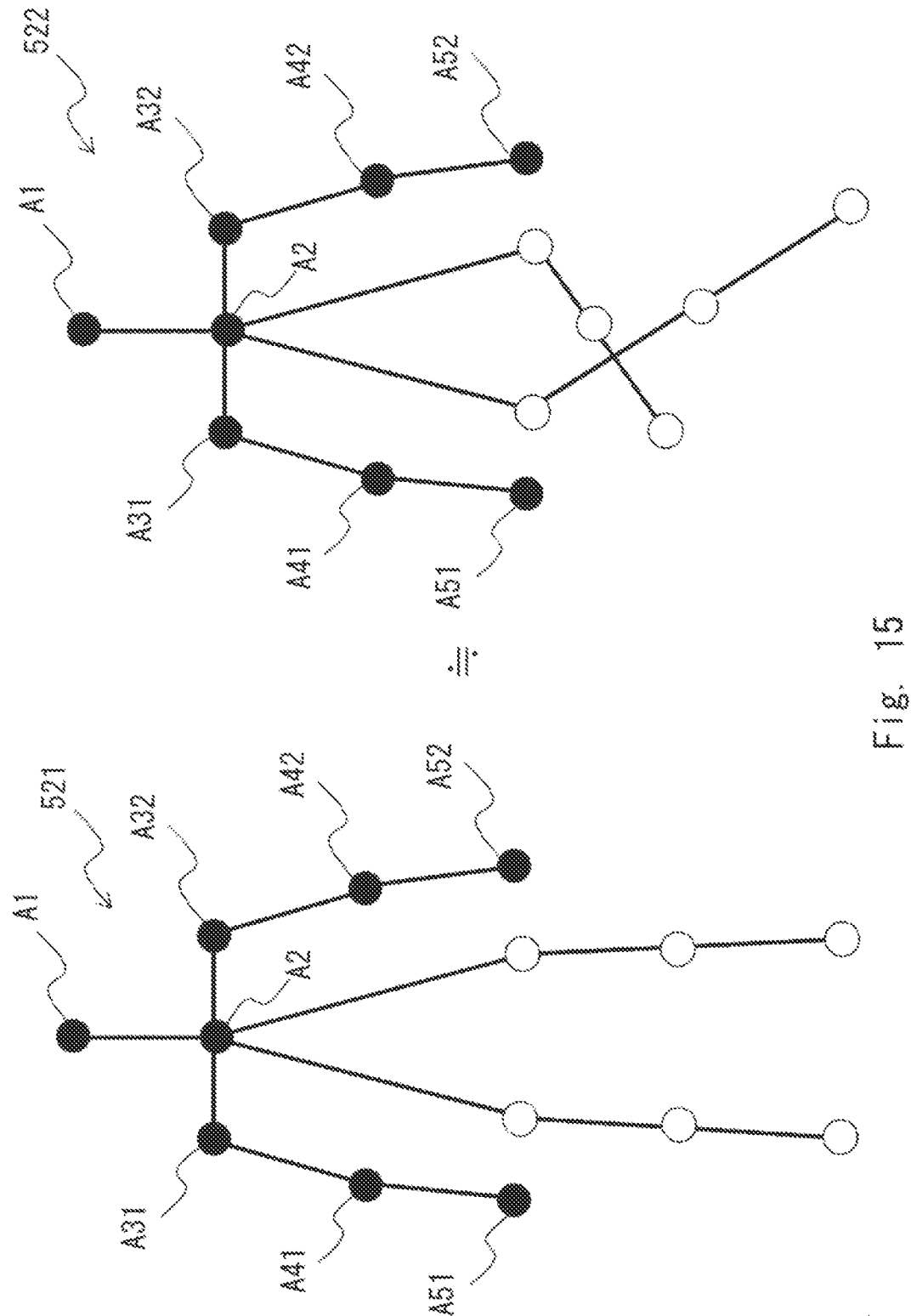
FIG. 15 is a diagram for describing the retrieving method according to the first example embodiment.

When a part of the body of a person in an image is hidden, the skeleton structures are retrieved using only information on a part that can be recognized. For example, as shown in skeleton structures 511 and 512 in FIG. 14, even in a case in which the key point of the left leg cannot be detected since the left leg is hidden, the skeleton structures can be retrieved using features of other key points that have been detected. Therefore, it can be determined that the skeleton structures 511 and 512 are the same posture at the time of retrieval (at the time of classification). That is, it is possible to perform classification and retrieval using features of some of the key points instead of using all the key points. In the example of the skeleton structures 521 and 522 shown in FIG. 15, while the orientations of both feet are different from each other, by using features of the key points of the upper body (A1, A2, A31, A32, A41, A42, A51, and A52) as a retrieval query, it can be determined that they are the same posture. Further, the skeleton structure may be retrieved by applying a weight to parts to be retrieved (feature points), or a threshold of the determination of the degree of similarity may be changed. When a part of the body is hidden, the skeleton structures may be retrieved by ignoring the hidden part, or the skeleton structures may be retrieved by taking the hidden part into account. By retrieving the skeleton structures by taking the hidden part into account, postures where the same part is hidden can be retrieved.

Figure 16:
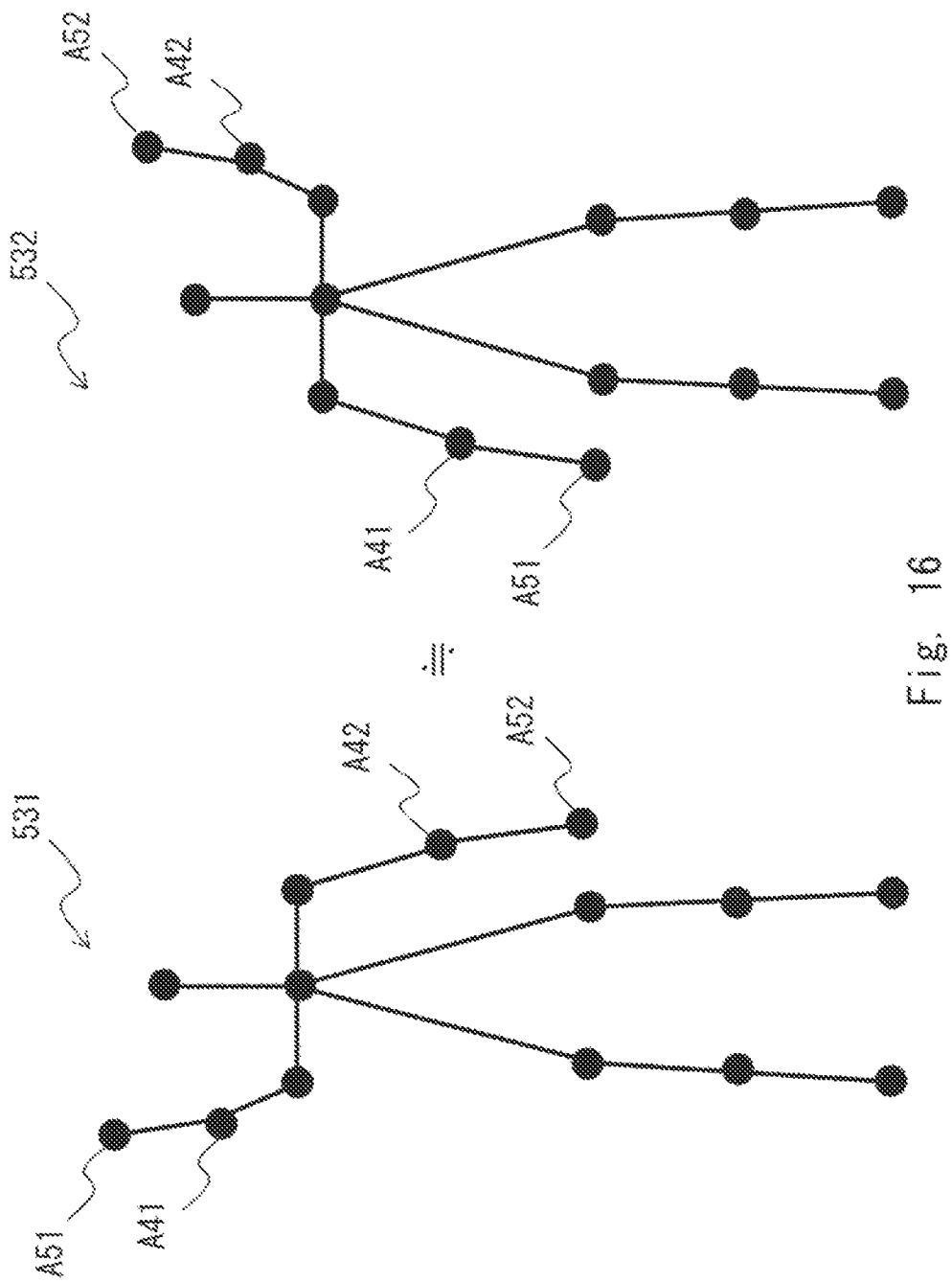
FIG. 16 is a diagram for describing the retrieving method according to the first example embodiment.

(Retrieving Method 3) Retrieval Regardless of Right and Left of Skeleton Structures Skeleton structures in which the right side and the left side of a person are opposite from each other are retrieved as the same skeleton structure. For example, like in skeleton structures 531 and 532 of FIG. 16, a posture in which a person is raising his/her right hand and a posture in which a person is raising his/her left hand can be retrieved (classified) as the same posture. In the example shown in FIG. 16, the positions of the key point of the right hand A51, the key point of the right elbow A41, the key point of the left hand A52, and the key point of the left elbow A42 in the skeleton structure 531 are different from those of the skeleton structure 532. However, the positions of the other key points in the skeleton structure 531 are the same as those of the skeleton structure 532. When the key points of one of the skeleton structures, i.e., the key point of the right hand A51 and the key point of the right elbow A41 of the skeleton structure 531 and the key point of the left hand A52 and the key point of the left elbow A42 of the skeleton structure 532, are horizontally flipped, the positions of the resulting key points become the same as the key points of the other one of the skeleton structures. Further, when the key points of one of the skeleton structures, i.e., the key point of the left hand A52 and the key point of the left elbow A42 of the skeleton structure 531 or the key point of the right hand A51 and the key point of the right elbow A41 of the skeleton structure 532, are horizontally flipped, the resulting key points become the same as the key points of the other one of the skeleton structures. Therefore, they are determined as the same posture.

(Retrieving Method 4) Retrieval by Features in Vertical Direction and Features in Horizontal Direction After the skeleton structures are retrieved using only features of the vertical direction (Y-axis direction) of a person, the obtained results are retrieved further using features in the horizontal direction (X-axis direction) of the person.

(Retrieving Method 5) Retrieval by Plurality of Images Along Time Series

The skeleton structures are retrieved based on features of the skeleton structures in a plurality of images that are continuous in time series. For example, features may be stacked in the time-series direction and the skeleton structures may be retrieved based on the accumulated value. Further, the skeleton structures may be retrieved based on a change (an amount of change) in the features of the skeleton structures in a plurality of continuous images.

Figure 17:
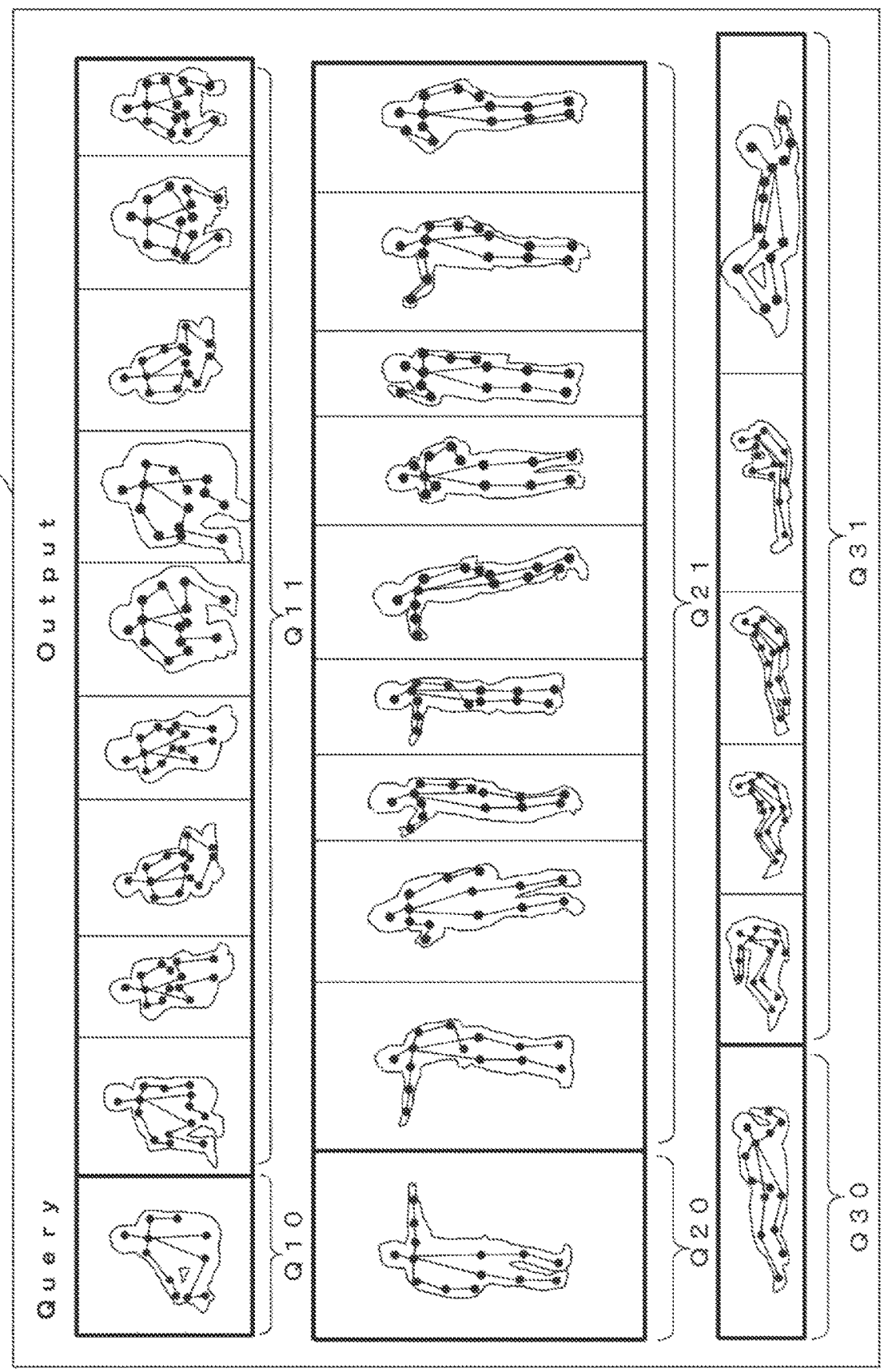
FIG. 17 is a diagram showing an example of displaying results of retrieval according to the first example embodiment.

Further, the retrieving unit 105 displays the results of retrieval of the skeleton structures (S123). The retrieving unit 105 acquires images of the skeleton structures and persons that are necessary from the database 110 and displays the skeleton structures and the persons obtained as results of retrieval on the display unit 107. When, for example, a plurality of retrieval queries (retrieval conditions) are specified, the results of retrieval are displayed for each retrieval query. FIG. 17 shows a display example of a case in which the skeleton structures are retrieved by three retrieval queries (postures). For example, as shown in FIG. 17, the skeleton structures and the persons of retrieval queries Q10, Q20, and Q30 specified in the left end part are displayed on a display window W2, and the skeleton structures and the persons of results of retrieval Q11, Q21, and Q31 of the respective retrieval queries are displayed on the right side of the retrieval queries Q10, Q20, and Q30 in an aligned manner.

The order in which the results of retrieval are displayed next to the retrieval queries in an aligned manner may be an order in which the corresponding skeleton structures have been found or a descending order of degree of similarity. When the skeleton structures have been retrieved by applying a weight to a part (feature point) of the partial retrieval, the results of retrieval may be displayed in the order of degree of similarity calculated by weighting. The results of retrieval may be displayed in the order of degree of similarity calculated only from the part (feature point) the user has selected. Further, images (frames) before and after the image (frame) of the result of retrieval in the time series may be extracted for a certain period of time and these extracted images (frames) may be displayed.

As described above, in this example embodiment, skeleton structures of a person are detected from a two-dimensional image and the skeleton structures can be classified and retrieved based on the features of the skeleton structures that have been detected. Accordingly, similar postures with a high degree of similarity can be classified into one group, and similar postures with a high degree of similarity with the retrieval query (retrieval key) can be retrieved. By classifying and displaying similar postures from an image, it is possible to grasp a posture of a person in an image without the user specifying the posture and the like. Since the user is able to specify the posture of the retrieval query from among the results of classification, it is possible to retrieve a desired posture even in a case in which the user does not grasp the posture to be retrieved in detail in advance. For example, the classification and retrieval may be performed based on all or some of the skeleton structures, whereby the classification and retrieval may be performed in a flexible manner.

Second Example Embodiment

Hereinafter, with reference to the drawings, a second example embodiment will be described. In this example embodiment, specific examples of calculating features according to the first example embodiment will be described. In this example embodiment, the features are obtained by normalizing skeleton structures using the body height of a person. The other points are similar to those in the first example embodiment.

Figure 18:
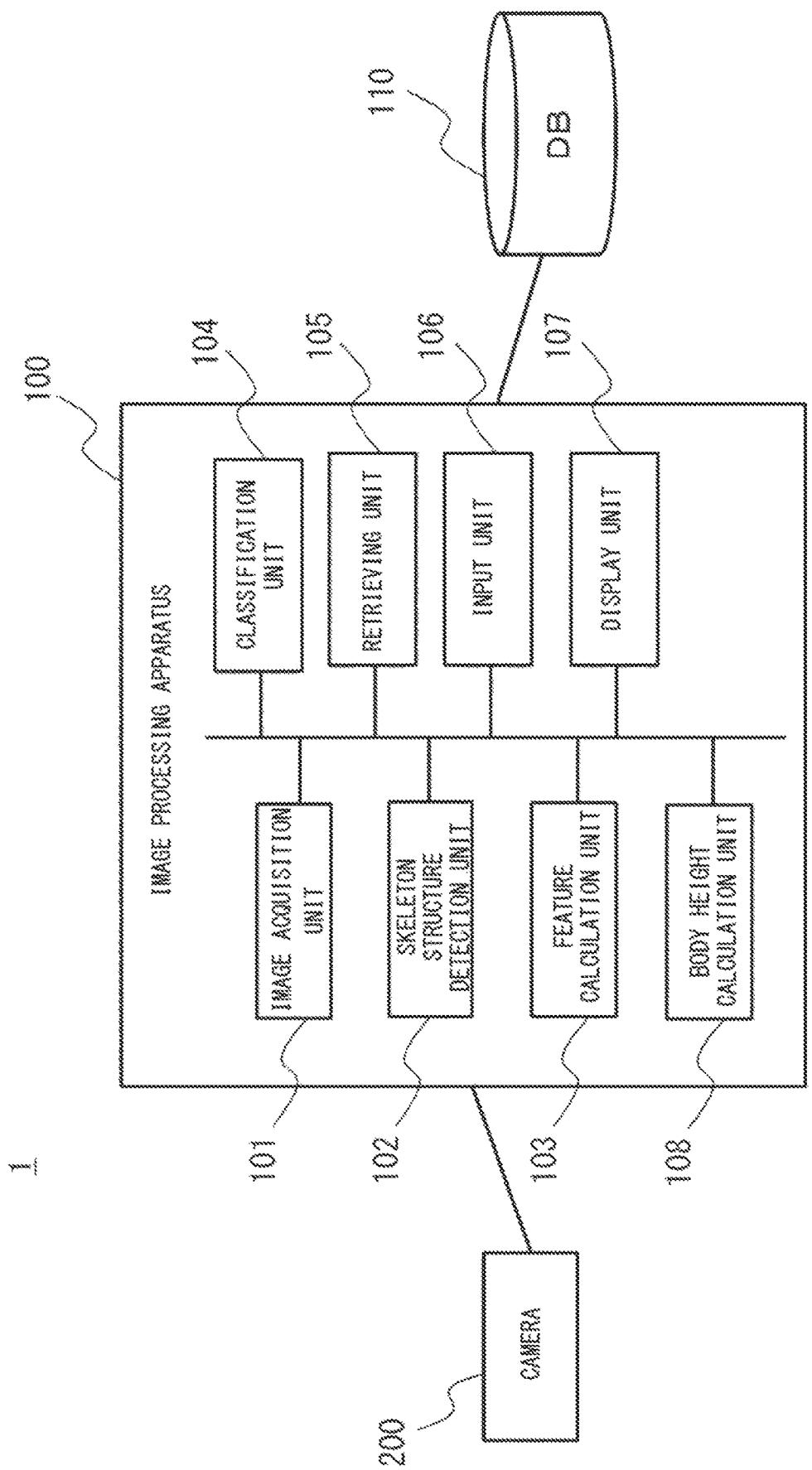
FIG. 18 is a configuration diagram showing a configuration of an image processing apparatus according to a second example embodiment.

FIG. 18 shows a configuration of an image processing apparatus 100 according to this example embodiment. As shown in FIG. 18, the image processing apparatus 100 further includes, besides the components of the first example embodiment, a body height calculation unit 108. The feature calculation unit 103 and the body height calculation unit 108 may be formed as one processing unit.

The body height calculation unit (body height estimation unit) 108 calculates (estimates) the height of the person when he/she stands upright (this is referred to as a body height pixel number) in a two-dimensional image based on a two-dimensional skeleton structure detected by the skeleton structure detection unit 102. It can also be said that the body height pixel number is the body height of the person in the two-dimensional image (the length of the whole body of the person in a two-dimensional image space). The body height calculation unit 108 obtains the body height pixel number (pixel number) from the lengths of the respective bones of the skeleton structure that has been detected (length in the two-dimensional image space).

In the following examples, specific examples 1-3 are used as a method of obtaining the body height pixel number. One of the methods described in the specific examples 1-3 may be used or a plurality of methods arbitrarily selected may be used in combination. In the specific example 1, the body height pixel number is obtained by adding up the lengths of the bones from the head part to the foot part of the bones of the skeleton structure. When the skeleton structure detection unit 102 (skeleton estimation technique) does not output the top of the head and the foot, obtained results may be corrected by multiplying them by a constant as necessary. In the specific example 2, the body height pixel number is calculated using a human body model indicating a relation between the lengths of the respective bones and the length of the whole body (the body height in the two-dimensional image space). In the specific example 3, the body height pixel number is calculated by fitting (applying) a three-dimensional human body model to the two-dimensional skeleton structure.

The feature calculation unit 103 according to this example embodiment is a normalizing unit that normalizes the skeleton structure (skeleton information) of the person based on the body height pixel number of the person that has been calculated. The feature calculation unit 103 stores, in the database 110, features (normalizing values) of the skeleton structure that has been normalized. The feature calculation unit 103 normalizes the height of each of the key points (feature points) included in the skeleton structure on the image by the body height pixel number. In this example embodiment, for example, the height direction is the up-down direction (Y-axis direction) in the space of two-dimensional coordinates (X-Y coordinates) of the image. In this case, the height of each of the key points can be obtained from the value (the number of pixels) of the Y-coordinate of each of the key points.

Alternatively, the height direction may be a direction of a vertical projection axis (vertical projection direction) in which the direction of a vertical axis that is vertical to the ground (reference plane) in the three-dimensional coordinate space in the real world is projected onto a two-dimensional coordinate space. In this case, the height of each of the key points can be obtained from a value (the number of pixels) along the vertical projection axis, which is obtained by projecting the axis vertical to the ground in the real world onto the two-dimensional coordinate space based on camera parameters. Note that the camera parameters, which are imaging parameters of an image, are, for example, the posture, the position, the imaging angle, and the focal distance of the camera 200. An object whose length and position are known in advance is captured by the camera 200 and the camera parameters can be obtained from this image. Some distortions occur in the both ends of the captured image, and the vertical direction in the real world may not coincide with the up-down direction of the image. On the other hand, by using parameters of the camera that has captured the image, it is possible to know how much the vertical direction in the real world is tilted in the image. Therefore, by normalizing the value of each of the key points along the vertical projection axis projected onto the image based on the camera parameters by the body height, the key points can be converted into features in consideration of the deviation between the real world and the image. The right-left direction (transverse direction) is the right-left direction (X-axis direction) in the space of the two-dimensional coordinates (X-Y coordinates) of the image or a direction obtained by projecting the direction parallel to the ground in the three-dimensional coordinate space in the real world onto the two-dimensional coordinate space.

Figure 19:
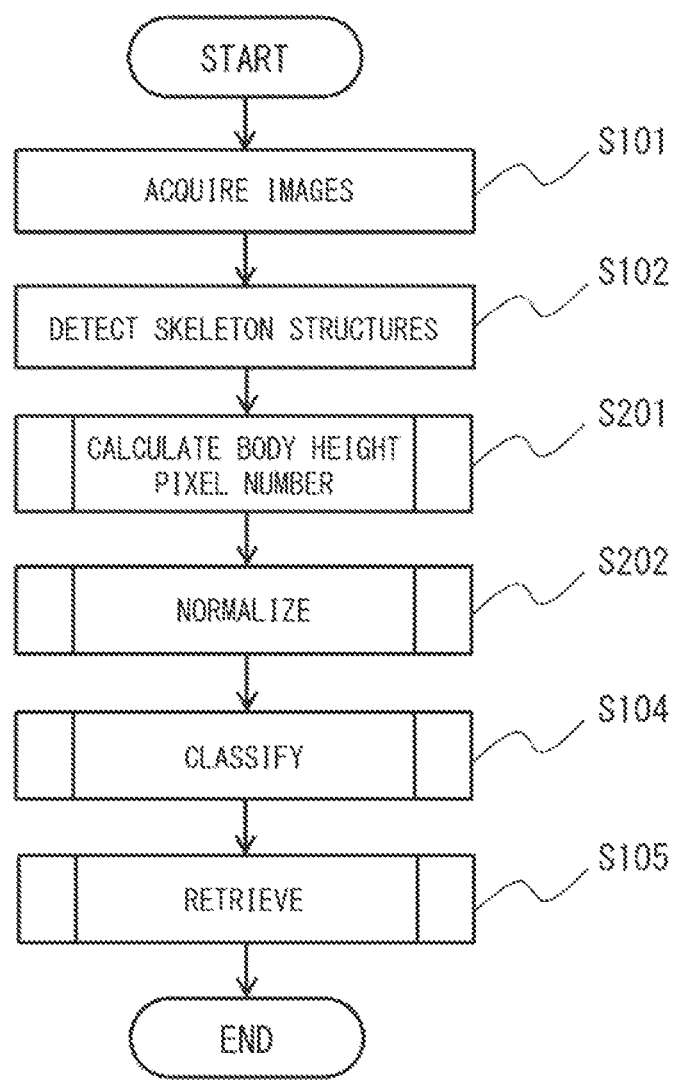
FIG. 19 is a flowchart showing an image processing method according to the second example embodiment.
Figure 20:
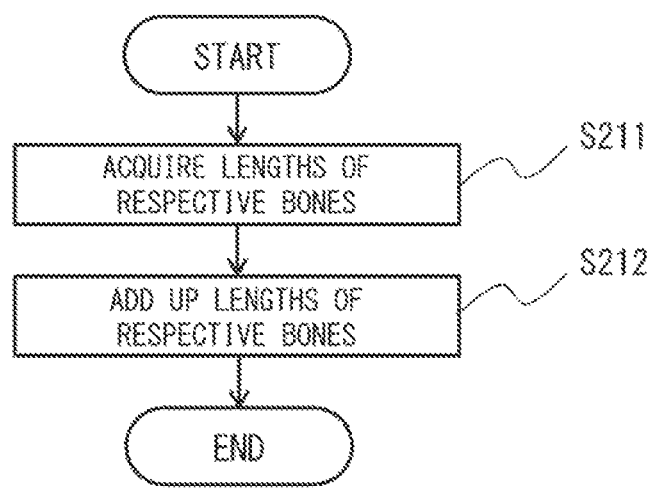
FIG. 20 is a flowchart showing a specific example 1 of a body height pixel number calculation method according to the second example embodiment.
Figure 21:
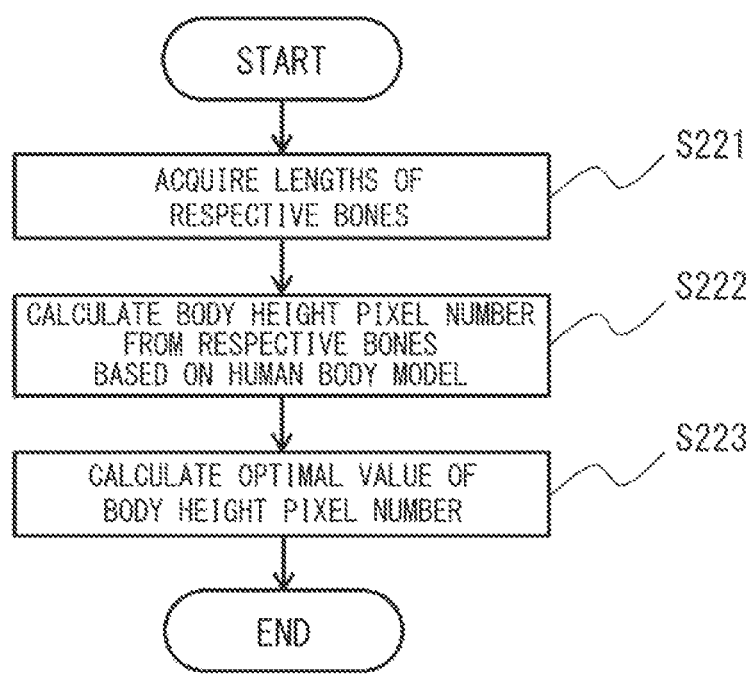
FIG. 21 is a flowchart showing a specific example 2 of the body height pixel number calculation method according to the second example embodiment.
Figure 22:
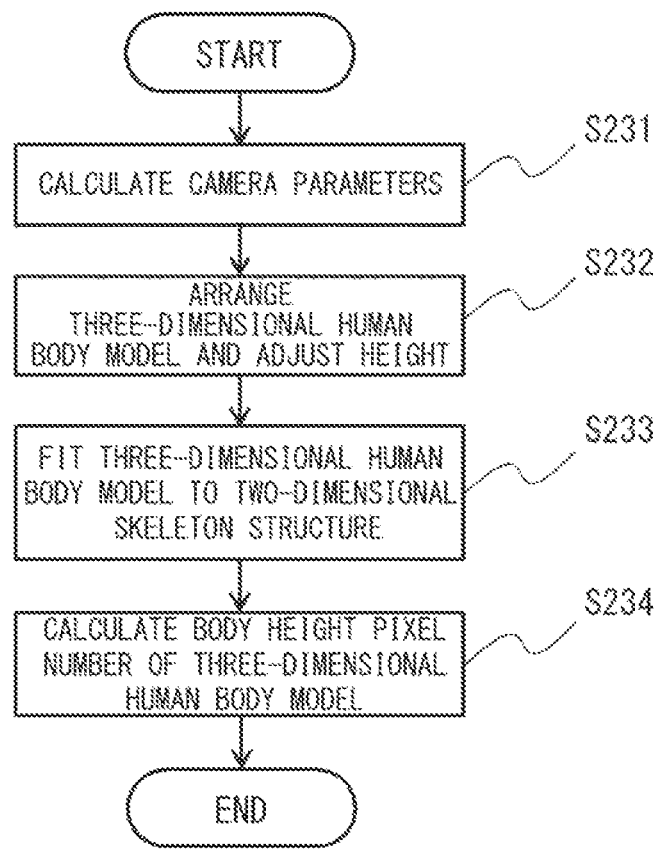
FIG. 22 is a flowchart showing a specific example 2 of the body height pixel number calculation method according to the second example embodiment.
Figure 23:
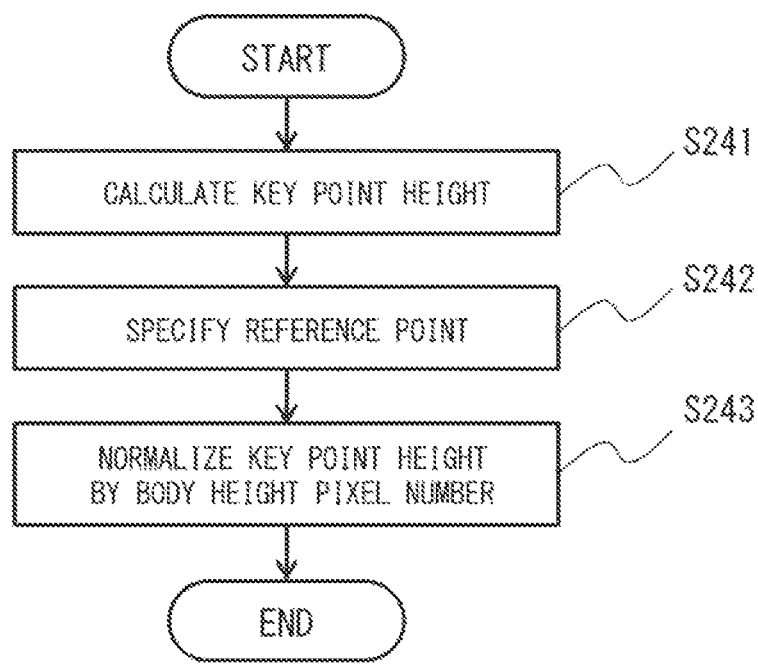
FIG. 23 is a flowchart showing a normalizing method according to the second example embodiment.

FIGS. 19-23 each show an operation of the image processing apparatus 100 according to this example embodiment. FIG. 19 shows a flow of the image processing apparatus 100 from image acquisition to retrieving processing, FIGS. 20-22 show flows of specific examples 1-3 of body height pixel number calculation processing (S201) shown in FIG. 19, and FIG. 23 shows a flow of normalization processing (S202) shown in FIG. 19.

As shown in FIG. 19, in this example embodiment, body height pixel number calculation processing (S201) and normalization processing (S202) are performed as feature calculation processing (S103) in the first example embodiment. The other points are similar to those in the first example embodiment.

Figure 24:
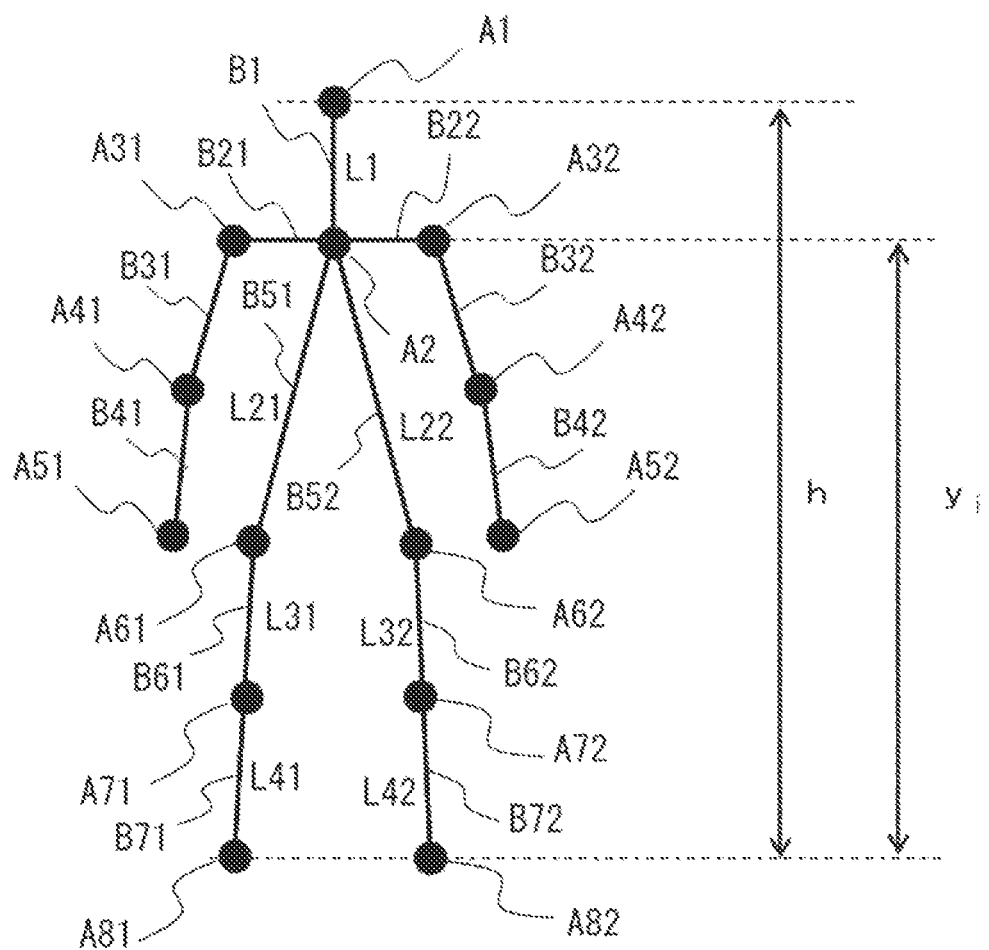
FIG. 24 is a diagram showing a human body model according to the second example embodiment.

The image processing apparatus 100 performs, following the image acquisition (S101) and detection of the skeleton structures (S102), body height pixel number calculation processing based on the detected skeleton structures (S201). In this example, as shown in FIG. 24, the height of the skeleton structure of the person when he/she is standing upright in the image is indicated by a body height pixel number (h) and the height of each key point of the skeleton structure in the state of the person in the image is indicated by a key point height ($y_i$). Hereinafter, specific examples 1-3 of the body height pixel number calculation processing will be described.

Specific Example 1

In a specific example 1, the body height pixel number is obtained using the lengths of the bones from the head part to the foot part. In the specific example 1, as shown in FIG. 20, the body height calculation unit 108 acquires the lengths of the respective bones (S211) and adds up the lengths of the respective bones that have been acquired (S212).

The body height calculation unit 108 acquires the lengths of the bones from the head part to the foot part of the person on the two-dimensional image to obtain the body height pixel number. That is, of the bones shown in FIG. 24, the length (the number of pixels) of each of the bone B1 (length L1), the bone B51 (length L21), the bone B61 (length L31) and the bone B71 (length L41), or the bone B1 (length L1), the bone B52 (length L22), the bone B62 (length L32) and the bone B72 (length L42) is acquired from the image in which the skeleton structure has been detected. The lengths of the respective bones can be obtained from the coordinates of the respective key points in the two-dimensional image. A value obtained by multiplying L1+L21+L31+L41 or L1+L22+L32+L42 by a correction constant is calculated as the body height pixel number (h). When the both values can be calculated, the value indicating the larger length is, for example, set as the body height pixel number. That is, the length of each bone in an image becomes the largest when it is captured from the front and the length of each bone becomes shorter when an angle at which the image is captured is tilted in the depth direction with respect to the camera. Accordingly, longer bones tend to indicate that they are highly likely to have been captured from the front and tend to be close to the actual value. Therefore, the longer one is preferably selected.

Figure 25:
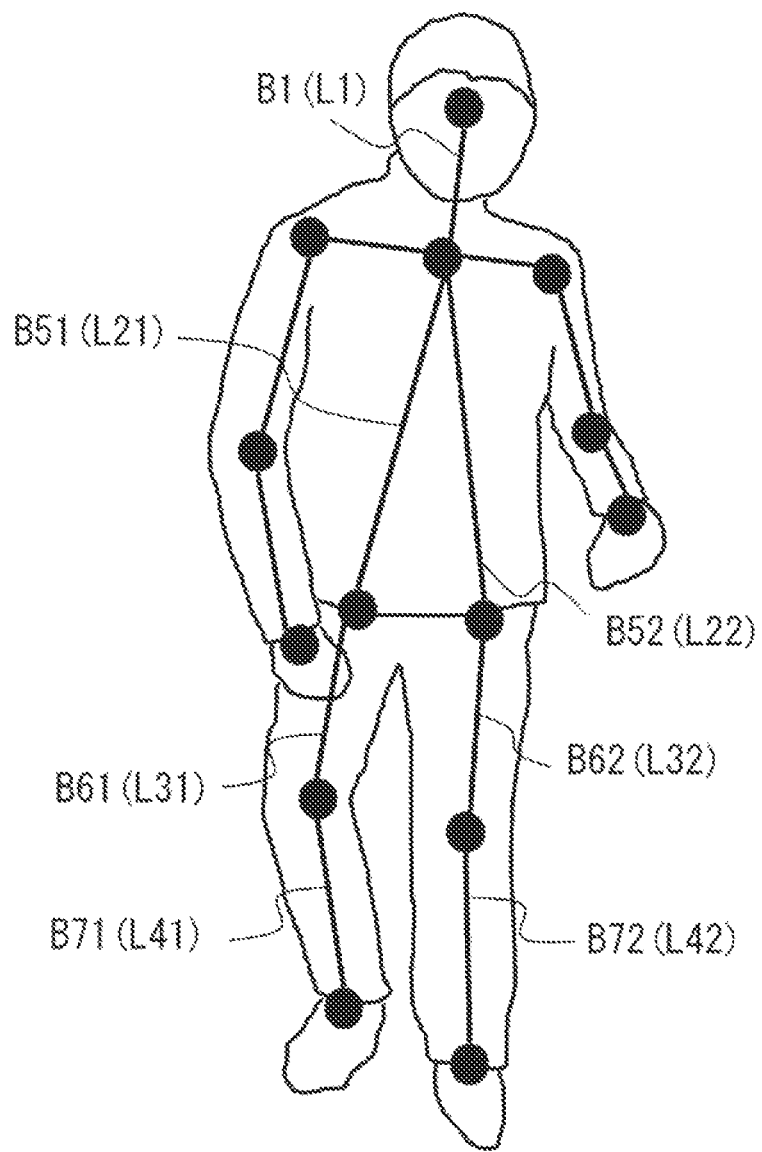
FIG. 25 is a diagram showing an example of detecting a skeleton structure according to the second example embodiment.

In the example shown in FIG. 25, the bone B1, the bone B51 and the bone B52, the bone B61 and the bone B62, and the bone B71 and the bone B72 are detected without overlapping each other. L1+L21+L31+L41 and L1+L22+L32+L42, each of which is the sum of these bones, are obtained. Then, for example, a value obtained by multiplying L1+L22+L32+L42, which is the sum of the bones on the left leg side whose length of the bones that has been detected is larger, by a correction constant is set as the body height pixel number.

Figure 26:
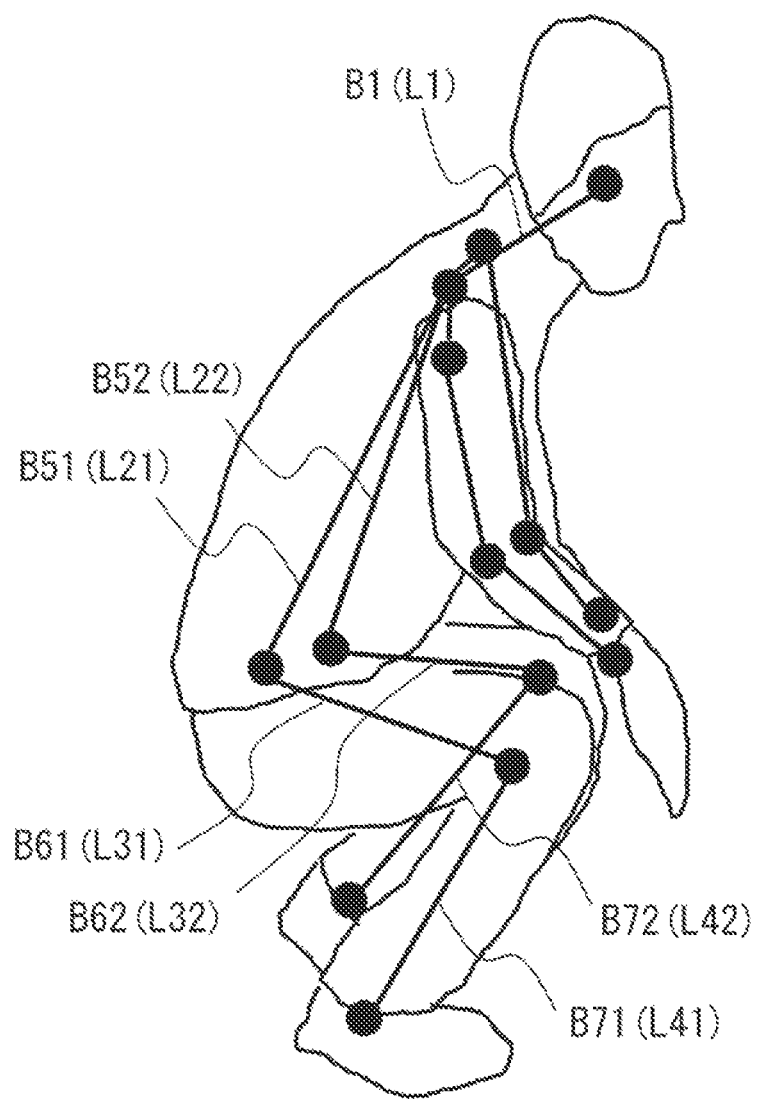
FIG. 26 is a diagram showing an example of detecting the skeleton structure according to the second example embodiment.

In the example shown in FIG. 26, the bone B1, the bone B51 and the bone B52, the bone B61 and the bone B62, and the bone B71 and the bone B72 are each detected, and the bones B62 and B71 of the right leg and the bones B62 and B72 of the left leg overlap each other. L1+L21+L31+L41 and L1+L22+L32+L42, each of which is the sum of these bones, are obtained. Then, for example, a value obtained by multiplying L1+L21+L31+L41, which is the sum of the bones on the right leg side whose length of the bones that has been detected is larger, by a correction constant is set as the body height pixel number.

Figure 27:
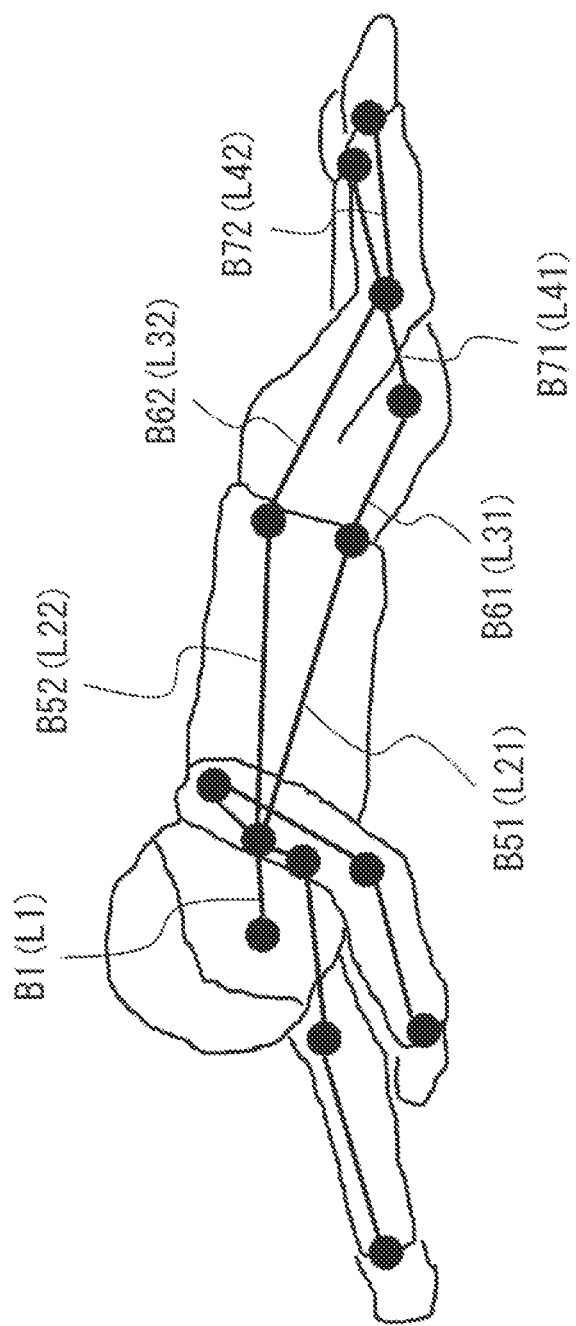
FIG. 27 is a diagram showing an example of detecting the skeleton structure according to the second example embodiment.

In the example shown in FIG. 27, the bone B1, the bone B51 and the bone B52, the bone B61 and the bone B62, the bone B71 and the bone B72 are each detected, and the bones B61 and B71 of the right leg and the bones B62 and B72 of the left leg overlap each other. For example, L1+L21+L31+L41 and the L1+L22+L32+L42, each of which is the sum of these bones, are obtained. Then, for example, a value obtained by multiplying L1+L22+L32+L42, which is the sum of the bones on the left leg side whose length of the bones that has been detected is larger, by a correction constant is set as the body height pixel number.

In the specific example 1, the body height can be obtained by adding up the lengths of the bones from the head to the foot, whereby the body height pixel number can be obtained in a simple method. Further, since it is sufficient that at least skeletons from the head to the foot be detected by the skeleton estimation technique using machine learning, the body height pixel number can be estimated with a high accuracy even in a case in which the entire person is not always shown in the image, such as in a case in which he/she is crouching.

Specific Example 2

In a specific example 2, a body height pixel number is obtained using a two-dimensional skeleton model indicating a relation between lengths of bones included in a two-dimensional skeleton structure and the length of the whole body of a person in a two-dimensional image space.

Figure 28:
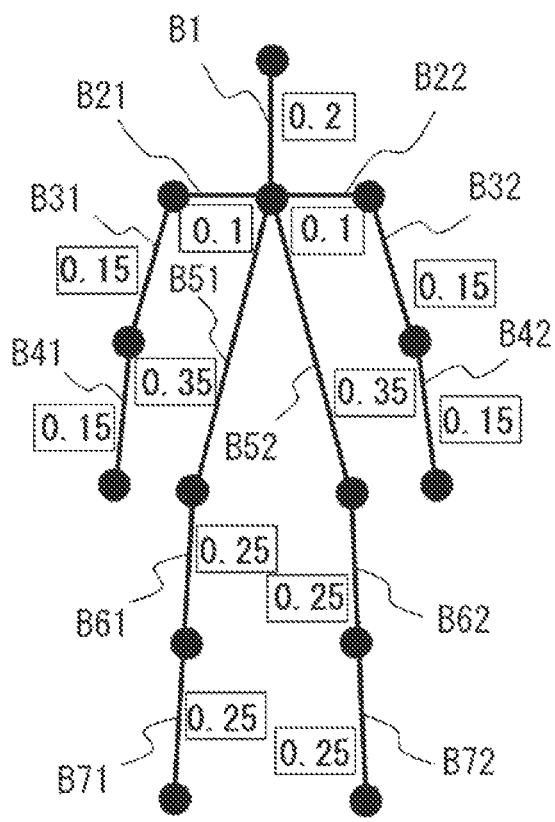
FIG. 28 is a diagram showing a human body model according to the second example embodiment.

FIG. 28 is a human body model (two-dimensional skeleton model) 301 indicating a relation between the lengths of the respective bones in the two-dimensional image space and the length of the whole body in the two-dimensional image space used in the specific example 2. As shown in FIG. 28, the relation between the lengths of the respective bones of an average person and the length of the whole body of the average person (the percentage of the lengths of the respective bones to the length of the whole body) is made to correspond to the respective bones of the human body model 301. For example, the length of the bone B1 of the head is equal to the length of the whole body×0.2 (20%), the length of the bone B41 of the right hand is equal to the length of the whole body×0.15 (15%), and the length of the bone B71 of the right leg is equal to the length of the whole body×0.25 (25%). By storing information on the human body model 301 in the database 110, the average length of the whole body can be obtained from the lengths of the respective bones. In addition to or in place of the human body model of the average person, a human body model may be prepared for each of the attributes of the person such as the age, the sex, and the nationality. Accordingly, the length of the whole body (body height) can be appropriately obtained depending on the attributes of the person.

Figure 29:
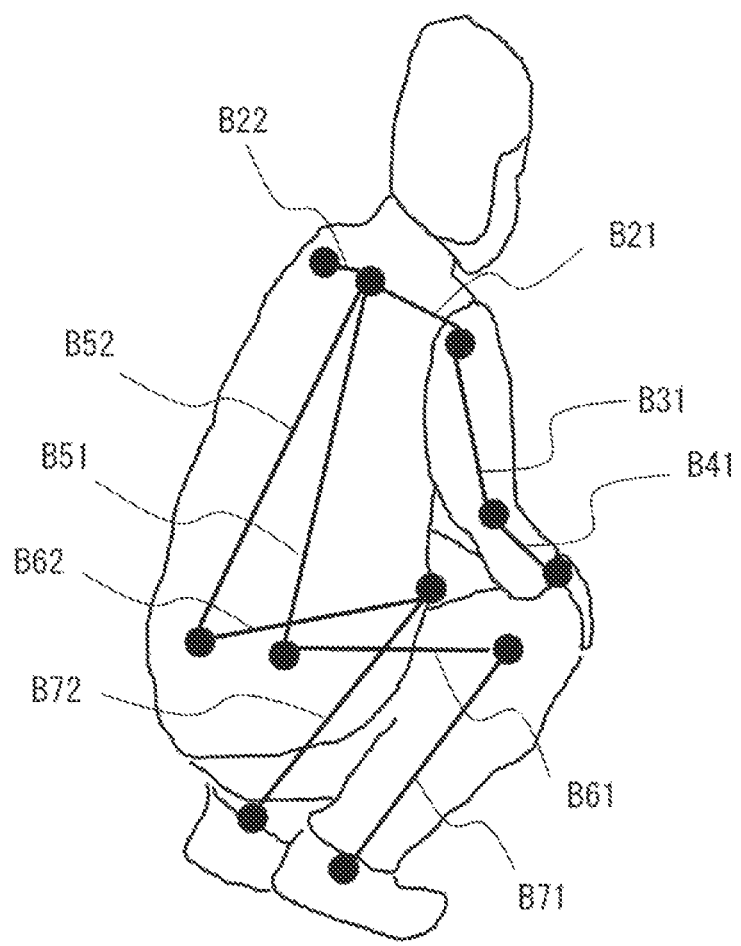
FIG. 29 is a diagram showing an example of detecting the skeleton structure according to the second example embodiment.

In the specific example 2, as shown in FIG. 21, the body height calculation unit 108 acquires the lengths of the respective bones (S221). The body height calculation unit 108 acquires the lengths of all the bones (the lengths of the bones in the two-dimensional image space) in the detected skeleton structure. FIG. 29 is an example in which an image of a crouching person is captured from the diagonally right back and the skeleton structure is detected. In this example, since the left side of the face of the person is not shown in the image, the bone of the head and those of the left arm and the left hand have not been detected. Therefore, the lengths of the respective bones B21, B22, B31, B41, B51, B52, B61, B62, B71, and B72 that have been detected are acquired.

Next, as shown in FIG. 21, the body height calculation unit 108 calculates the body height pixel number from the lengths of the respective bones based on the human body model (S222). The body height calculation unit 108 refers to the human body model 301 indicating the relation between the respective bones and the length of the whole body as shown in FIG. 28, and thus obtains the body height pixel number from the lengths of the respective bones. For example, since the length of the bone B41 of the right hand is equal to the length of the whole body×0.15, the body height pixel number which is based on the bone B41 is obtained from the length of the bone B41/0.15. Further, since the length of the bone B71 of the right leg is equal to the length of the whole body×0.25, the body height pixel number based on the bone B71 is obtained from the length of the bone B71/0.25.

While the human body model referred to at this time is, for example, the human body model of the average person, the human body model may be selected depending on the attributes of a person such as the age, the sex, and the nationality. When, for example, the face of the person is shown in the captured image, the attributes of the person are identified based on the face of this person and the human body model that corresponds to the identified attributes is referred to. It is possible to recognize the attributes of the person from the features of the face of the image by referring to information obtained by machine learning the face for each attribute. Further, the human body model of the average person may be used when the attributes of the person cannot be identified from the image.

Further, the body height pixel number calculated from the lengths of the bones may be corrected by camera parameters. When, for example, the camera is positioned in a high place and is made to capture an image of the person in such a way that it looks down at the person, the horizontal length such as bones of the shoulder width in the two-dimensional skeleton structure is not affected by the angle of depression of the camera, whereas the vertical length such as bones of the neck-waist becomes smaller as the angle of depression of the camera increases. Then, the body height pixel number calculated from the horizontal length such as bones of the shoulder width tends to become larger than the actual length. By using the camera parameters, it can be seen at what angle the camera looks down at the person, whereby it is possible to correct the body height pixel number to a two-dimensional skeleton structure that looks as if the image of the person were captured from the front by using the information on the angle of depression. It is therefore possible to calculate the body height pixel number more accurately.

Figure 30:
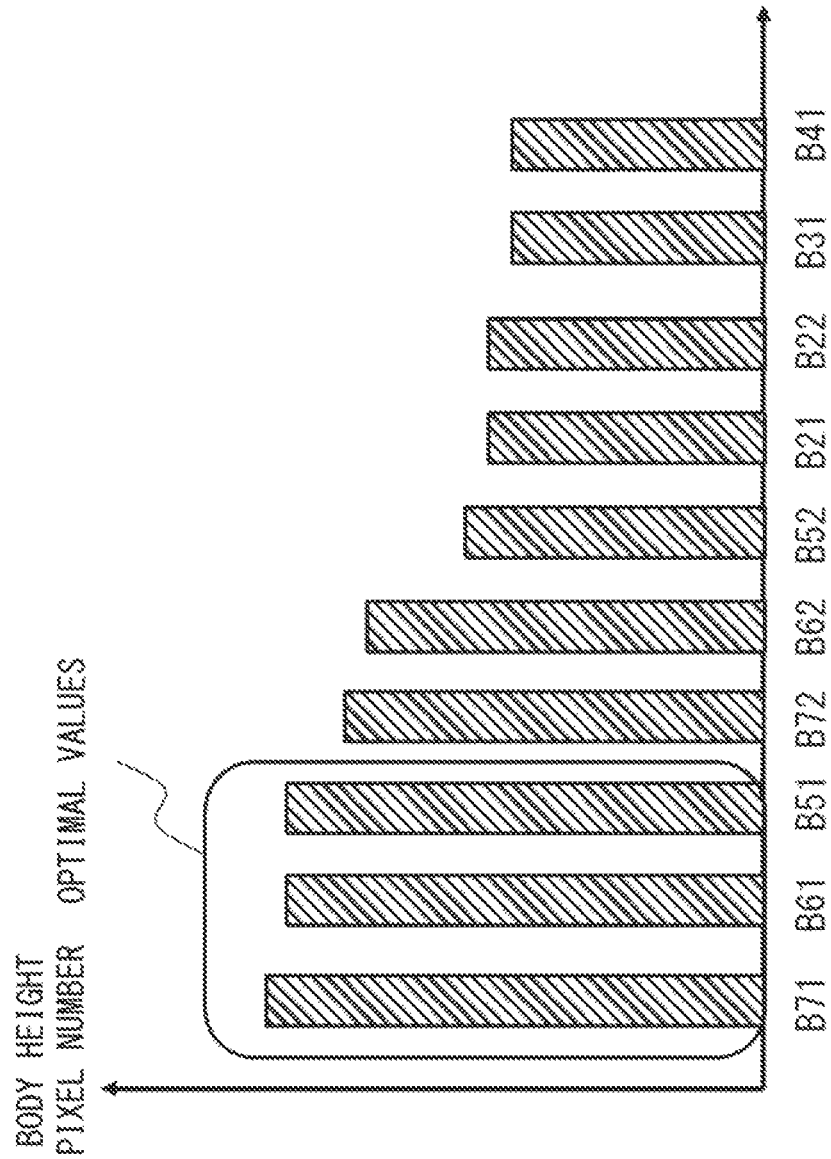
FIG. 30 is a histogram for describing the body height pixel number calculation method according to the second example embodiment.

Next, as shown in FIG. 21, the body height calculation unit 108 calculates an optimal value of the body height pixel number (S223). The body height calculation unit 108 calculates the optimal value of the body height pixel number from the body height pixel number obtained for each bone. For example, a histogram of body height pixel numbers obtained for the respective bones as shown in FIG. 30 is generated, and the largest body height pixel number is selected from among them. That is, one of the body height pixel numbers obtained based on the plurality of bones that is larger than the other ones is selected. It is assumed, for example, that the values of the top 30% are valid values. In FIG. 30, body height pixel numbers obtained based on the bones B71, B61, and B51 are selected. The average value of the selected body height pixel numbers may be obtained as the optimal value or the largest body height pixel number may be obtained as the optimal value. Since the body height is obtained from the lengths of the bones of the two-dimensional image, when the image of the bones has not been captured from the front, that is, when the image of the bones has been captured obliquely in the depth direction when they are seen from the camera, the lengths of the bones become shorter than those in a case in which they are captured from the front. Then, a value whose body height pixel number is large means that an image is likely to have been captured from the front and is likely to be more appropriate than a value whose body height pixel number is small. Therefore, a value that is larger than the other ones is set as the optimal value.

In the specific example 2, the body height pixel number is obtained based on the bones of the skeleton structure that has been detected, using a human body model indicating the relation between the bones in the two-dimensional image space and the length of the whole body. Therefore, even when not all the skeletons from the head to the foot can be obtained, the body height pixel number can be obtained from some bones. In particular, by employing one of the values obtained from the plurality of bones which is larger than the other ones, the body height pixel number can be estimated with a high accuracy.

Specific Example 3

In a specific example 3, a two-dimensional skeleton structure is made to fit to a three-dimensional human body model (three-dimensional skeleton model), and a skeleton vector of the whole body is obtained using the body height pixel number of the three-dimensional human body model fit to the two-dimensional skeleton structure.

In the specific example 3, as shown in FIG. 22, the body height calculation unit 108 first calculates camera parameters based on images captured by the camera 200 (S231). The body height calculation unit 108 extracts an object whose length is known in advance from among the plurality of images captured by the camera 200 and obtains camera parameters from the size (the number of pixels) of the object that has been extracted. The camera parameters may be obtained in advance and the camera parameters obtained in advance may be acquired as necessary.

Next, the body height calculation unit 108 adjusts the arrangement and the height of the three-dimensional human body model (S232). The body height calculation unit 108 prepares, for a detected two-dimensional skeleton structure, a three-dimensional human body model for calculating the body height pixel number and arranges it in the same two-dimensional image based on the camera parameters. Specifically, "a relative positional relationship between the camera and the person in the real world" is specified from the camera parameters and the two-dimensional skeleton structure. The body height calculation unit 108 specifies the coordinates (x, y, z) of the position where the person is standing (or sitting), assuming, for example, that the coordinates of the position of the camera are (0, 0, 0). Then, by assuming an image captured by arranging the three-dimensional human body model in the position (x, y, z) the same as that of the specified person, the two-dimensional skeleton structure is made to overlap the three-dimensional human body model.

Figure 31:
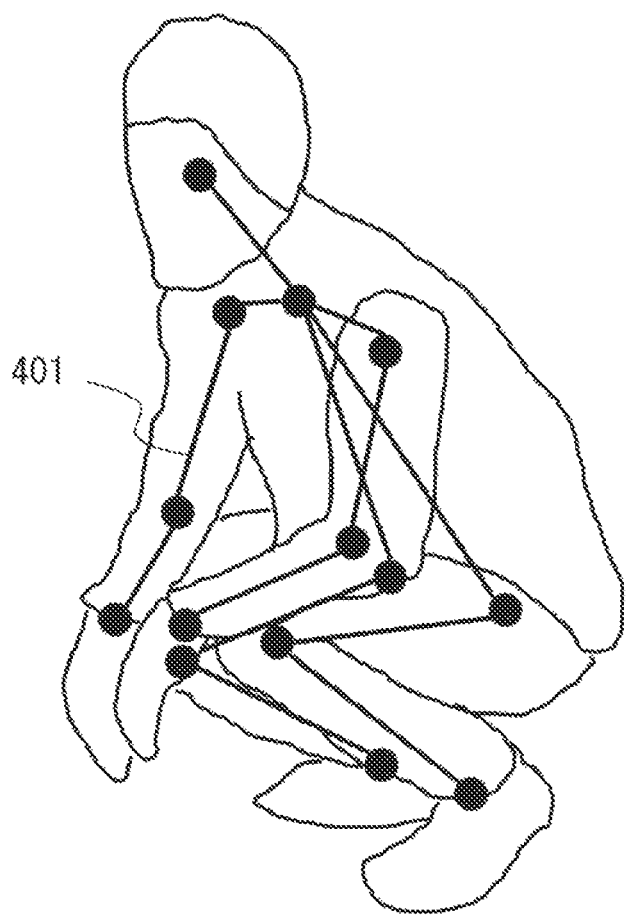
FIG. 31 is a diagram showing an example of detecting the skeleton structure according to the second example embodiment.
Figure 32:
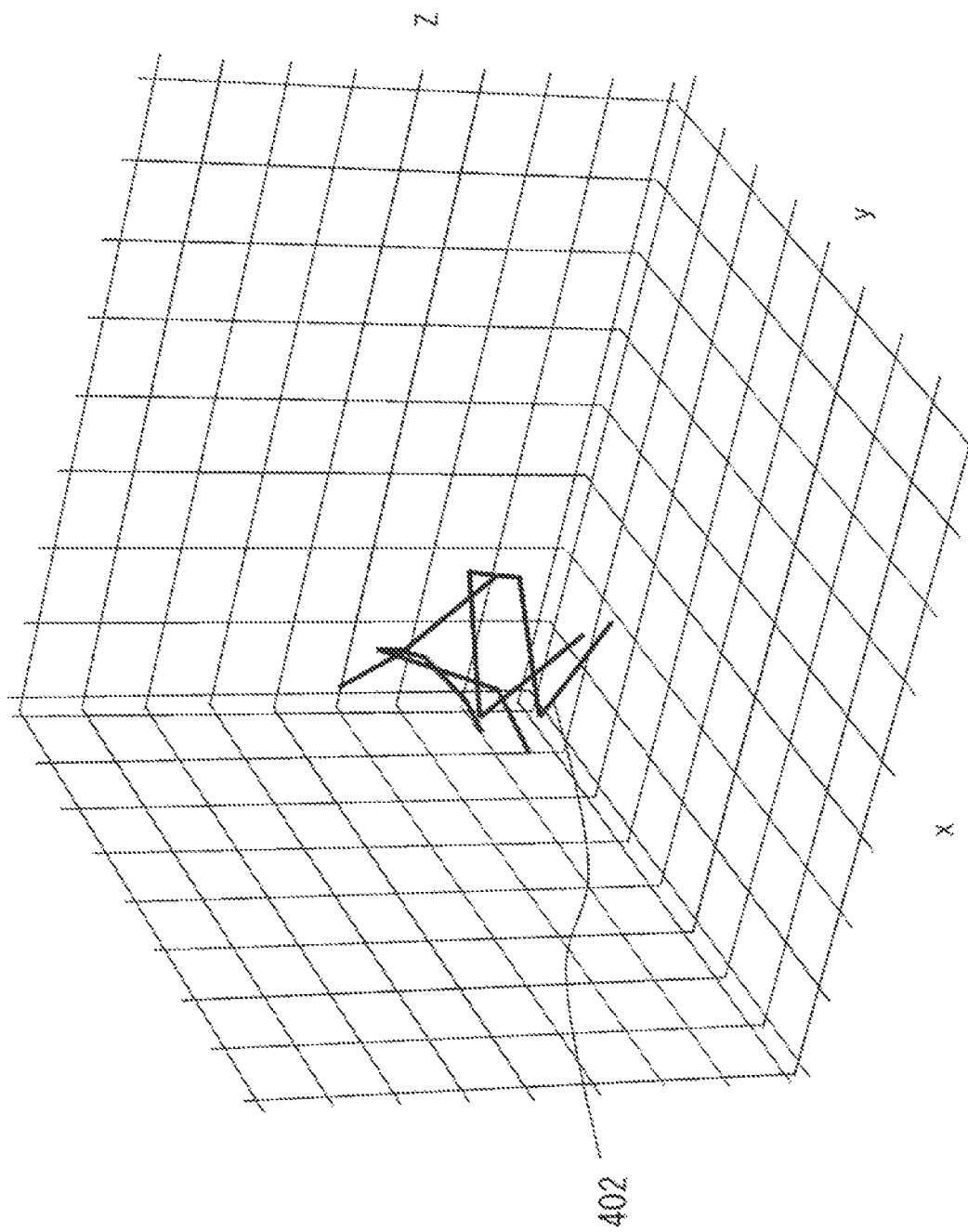
FIG. 32 is a diagram showing a three-dimensional human body model according to the second example embodiment.

FIG. 31 is an example of detecting a two-dimensional skeleton structure 401 by capturing an image of a crouching person from the diagonally forward left. The two-dimensional skeleton structure 401 includes two-dimensional coordinate information. While it is preferable that all the bones be detected, some bones may not be detected. With respect to this two-dimensional skeleton structure 401, a three-dimensional human body model 402 as shown in FIG. 32 is prepared. The three-dimensional human body model (three-dimensional skeleton model) 402 is a model that has three-dimensional coordinate information and has skeletons whose shape is the same as that of the two-dimensional skeleton structure 401. Then, as shown in FIG. 33, the prepared three-dimensional human body model 402 is arranged and is made to overlap the detected two-dimensional skeleton structure 401. Further, when the prepared three-dimensional human body model 402 is made to overlap the detected two-dimensional skeleton structure 401, the height of the three-dimensional human body model 402 is adjusted in such a way that it fits the two-dimensional skeleton structure 401.

As shown in FIG. 33, the three-dimensional human body model 402 prepared at this time may be a model which is in a state close to the posture of the two-dimensional skeleton structure 401 or may be a model which is in a state in which he/she stands upright. For example, the three-dimensional human body model 402 of the estimated posture may be generated using a technique of estimating the posture of the three-dimensional space from the two-dimensional image using machine learning. By learning information on the joints of the two-dimensional image and the joints of the three-dimensional space, the three-dimensional posture can be estimated from the two-dimensional image.

Figure 34:
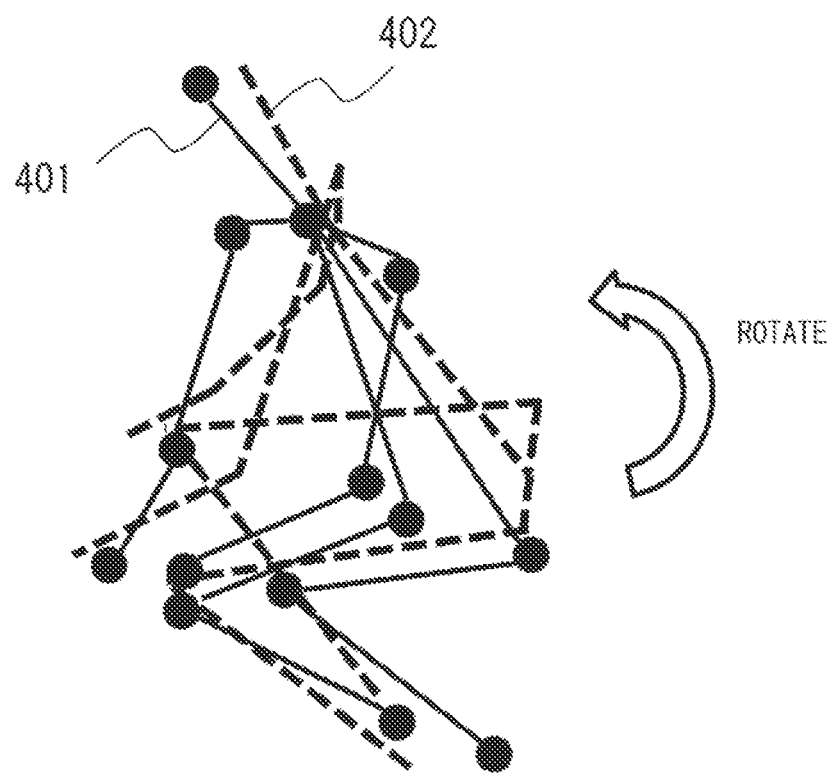
FIG. 34 is a diagram for describing the body height pixel number calculation method according to the second example embodiment.

Next, as shown in FIG. 22, the body height calculation unit 108 causes the three-dimensional human body model to be fit to the two-dimensional skeleton structure (S233). As shown in FIG. 34, the body height calculation unit 108 deforms the three-dimensional human body model 402 in such a way that the posture of the three-dimensional human body model 402 and that of the two-dimensional skeleton structure 401 coincide with each other in a state in which the three-dimensional human body model 402 is made to overlap the two-dimensional skeleton structure 401. That is, the body height, the orientation of the body, and the angles of the joints of the three-dimensional human body model 402 are adjusted and are optimized in such a way that there is no difference between the three-dimensional human body model 402 and the two-dimensional skeleton structure 401. For example, the joints of the three-dimensional human body model 402 are rotated in a range of motion of a person, and the whole three-dimensional human body model 402 is rotated or the entire size is adjusted. The fitting (application) of the three-dimensional human body model and the two-dimensional skeleton structure is performed in the two-dimensional space (two-dimensional coordinates). That is, the three-dimensional human body model is mapped onto the two-dimensional space and the three-dimensional human body model is optimized to the two-dimensional skeleton structure in consideration of how the deformed three-dimensional human body model is changed in the two-dimensional space (image).

Figure 35:
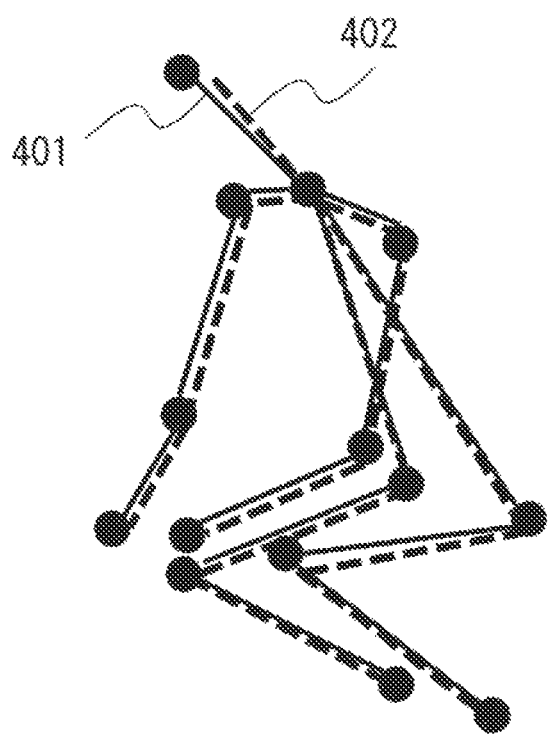
FIG. 35 is a diagram for describing the body height pixel number calculation method according to the second example embodiment.

Next, as shown in FIG. 22, the body height calculation unit 108 calculates the body height pixel number of the three-dimensional human body model that is made to fit to the two-dimensional skeleton structure (S234). As shown in FIG. 35, the body height calculation unit 108 obtains, when there is no difference between the three-dimensional human body model 402 and the two-dimensional skeleton structure 401 and thus the postures coincide with each other, the body height pixel number of the three-dimensional human body model 402 in this state. The body height calculation unit 108 obtains the length of the whole body in the two-dimensional space based on camera parameters as a state in which the optimized three-dimensional human body model 402 is made to stand upright. The body height calculation unit 108 calculates, for example, the body height pixel number by the lengths of the bones (the number of pixels) from the head to the foot when the three-dimensional human body model 402 is made to stand upright. Like in the specific example 1, the lengths of the bones from the head part to the foot part of the three-dimensional human body model 402 may be added up.

In the specific example 3, by causing the three-dimensional human body model to be fit to the two-dimensional skeleton structure based on the camera parameters and obtaining the body height pixel number based on the three-dimensional human body model, the body height pixel number can be estimated with a high accuracy even in a case in which there is a large error since all the bones are not shown in the front, that is, all the bones are shown diagonally.

<Normalization Processing>

As shown in FIG. 19, the image processing apparatus 100 performs normalization processing (S202) after performing the body height pixel number calculation processing. As shown in FIG. 23, the feature calculation unit 103 calculates the key point height (S241). The feature calculation unit 103 calculates the key point height (the number of pixels) of all the key points included in the detected skeleton structure. The key point height is the length (the number of pixels) of the height direction from the lowest end (e.g., the key point of one of the feet) of the skeleton structure to its key point. In this example, the key point height is obtained from the Y-coordinate of the key point in the image. As described above, the key point height may be obtained from the length of the direction along the vertical projection axis based on the camera parameters. In the example shown in FIG. 24, for example, the height ($y_i$) of the key point A2 of the neck is a value obtained by subtracting the Y-coordinate of the key point A81 of the right foot or the Y-coordinate of the key point A82 of the left foot from the Y-coordinate of the key point A2.

Next, the feature calculation unit 103 specifies the reference point for normalization (S242). The reference point is a point that serves as a reference indicating the relative height of the key point. The reference point may be set in advance or may be selected by a user. The reference point is preferably the center of the skeleton structure or higher than this center (upside in the up-down direction of the image) and may be, for example, coordinates of the key point of the neck. The reference point is not limited to the coordinates of the neck and may be the coordinates of the key point of the head or other key points. Further, the reference point is not limited to a key point and may be desired coordinates (e.g., center coordinates or the like of the skeleton structure).

Next, the feature calculation unit 103 normalizes the key point height ($y_i$) by the body height pixel number (S243). The feature calculation unit 103 normalizes each key point using the key point height of each key point, the reference point, and the body height pixel number. Specifically, the feature calculation unit 103 normalizes the relative height of the key point with respect to the reference point by the body height pixel number. In this example, as an example in which only the height direction is focused on, only the Y-coordinate is extracted, and normalization is performed assuming that the reference point is the key point of the neck. Specifically, the feature (normalizing value) is obtained using the following Expression (1), assuming that the Y-coordinate of the reference point (key point of the neck) is ($y_c$). When the vertical projection axis based on the camera parameters is used, ($y_i$) and ($y_c$) are converted into values in the direction along the vertical projection axis.

[Expression 1]

$$f_i = (y_i - y_c)/h \qquad (1)$$

When, for example, the number of key points is 18, coordinates ($x_0$, $y_0$), ($x_1$, $y_1$), ... ($x_{17}$, $y_{17}$) of 18 key points are converted into 18-dimensional features as follows using the above Expression (1).

[Expression 2]

$$f_0 = (y_0 - y_c)/h \qquad (2)$$
$$f_1 = (y_1 - y_0)/h$$
$$\vdots$$
$$f_{17} = (y_{17} - y_c)/h$$

Figure 36:
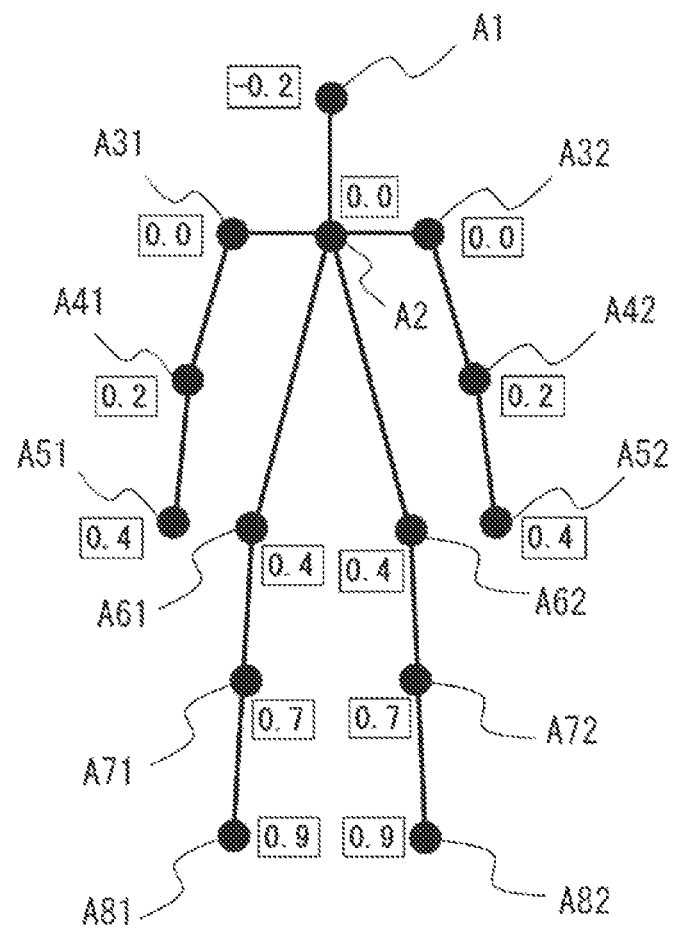
FIG. 36 is a diagram for describing the normalizing method according to the second example embodiment.
Figure 37:
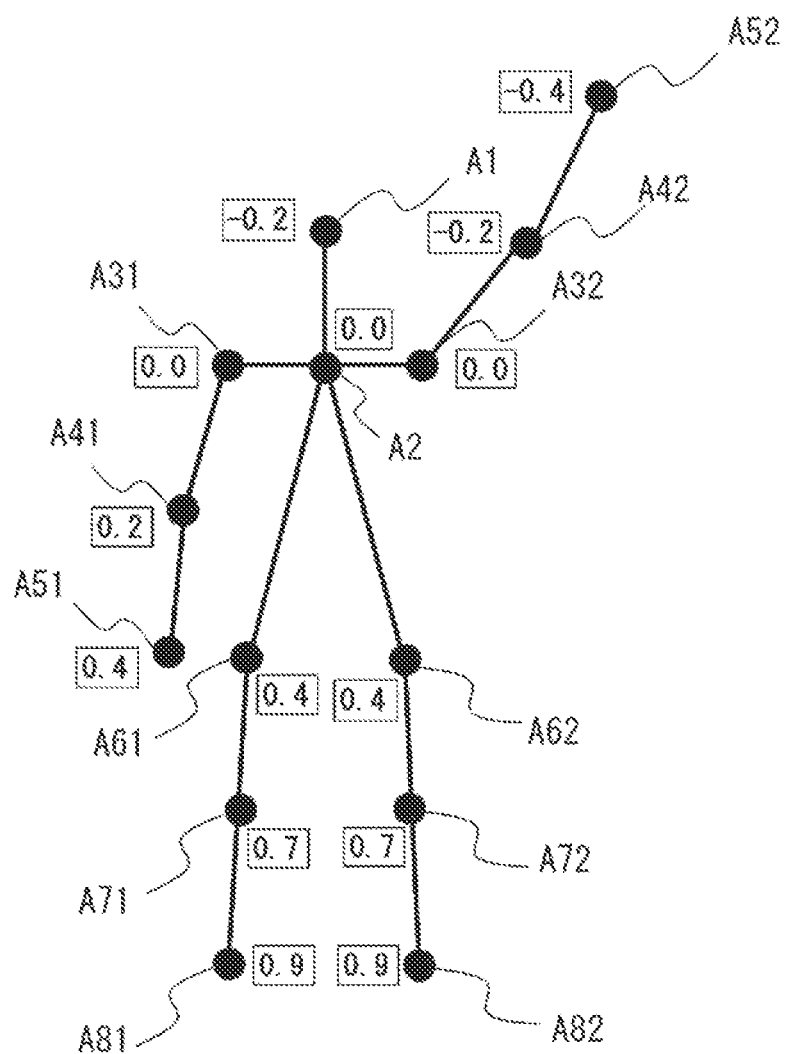
FIG. 37 is a diagram for describing the normalizing method according to the second example embodiment.
Figure 38:
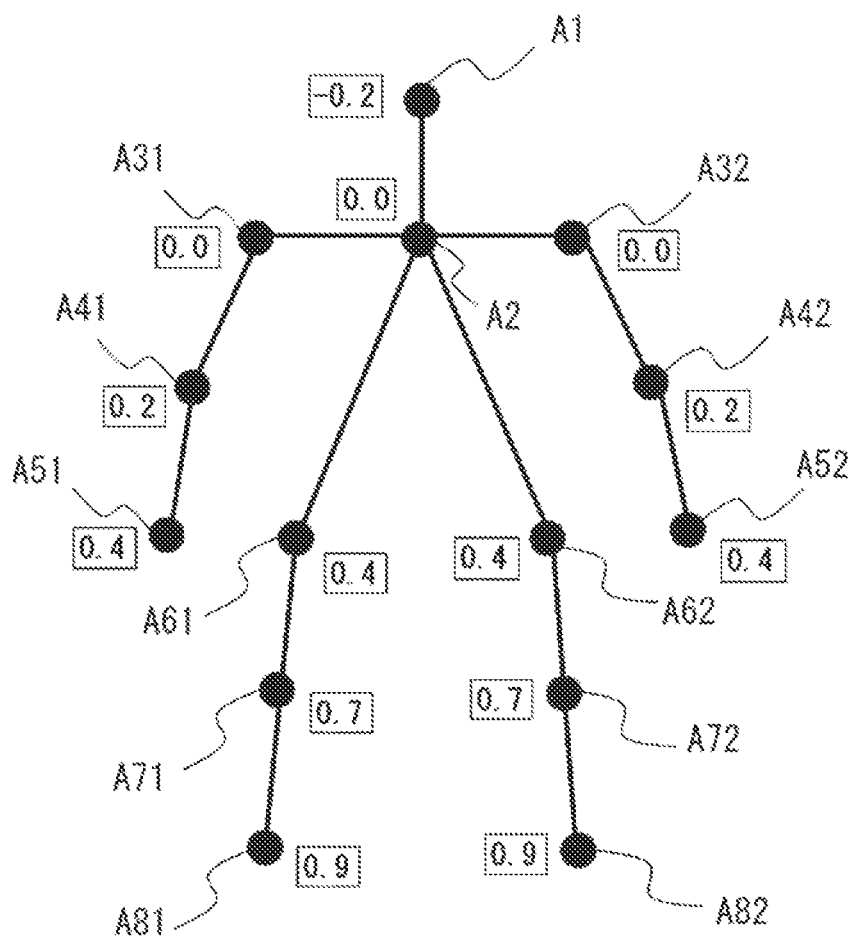
FIG. 38 is a diagram for describing the normalizing method according to the second example embodiment.

FIG. 36 shows an example of the features of the respective key points obtained by the feature calculation unit 103. In this example, the key point A2 of the neck is set as the reference point. Therefore, the feature of the key point A2 is 0.0, so is the feature of the key point A31 of the right shoulder and the key point A32 of the left shoulder whose height is the same as that of the neck. The feature of the key point A1 of the head higher than the neck is −0.2. The feature of both the key point A51 of the right hand and the key point A52 of the left hand lower than the neck is 0.4, and the feature of both the key point A81 of the right foot and the key point A82 of the left foot is 0.9. When the person raises his/her left hand from the above state, the left hand becomes higher than the reference point as shown in FIG. 37 and the feature of the key point A52 of the left hand becomes −0.4. On the other hand, since normalization is performed using only coordinates of the Y-axis, the features remain the same as shown in FIG. 38 even when the width of the skeleton structure is changed from the state shown in FIG. 36. That is, the feature (normalizing value) according to this example embodiment, which indicates the feature of the skeleton structure (key point) in the height direction (Y-direction), is not affected by a change in the transverse direction (X-direction) of the skeleton structure.

As described above, in this example embodiment, the skeleton structure of a person is detected from a two-dimensional image and the respective key points of the skeleton structure are normalized using a body height pixel number (the height of the person when he/she stands upright in the two-dimensional image space) obtained from the detected skeleton structure. By using the normalized features, robustness when classification, retrieval, and the like are performed can be improved. That is, since features of this example embodiment are not affected by a change in the horizontal direction of a person as described above, robustness against a change in the orientation of the person or the body shape of the person is high.

Further, since this example embodiment can be achieved by detecting the skeleton structure of a person using the skeleton estimation technique such as OpenPose, there is no need to prepare training data for training postures or the like of the person. Further, by normalizing the key points of the skeleton structure and storing them in the database, it becomes possible to classify and retrieve the postures or the like of the person, whereby it is possible to classify and retrieve unknown postures. Further, by normalizing the key points of the skeleton structure, clear and comprehensive features can be obtained. Therefore, the user is likely to be satisfied with the results of processing, unlike a black box type algorithm such as machine learning.

Figure 39:
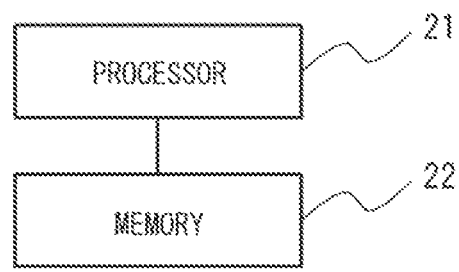
FIG. 39 is a configuration diagram showing an outline of hardware of a computer according to the example embodiment.

Note that each of the configurations in the aforementioned example embodiments may be formed of hardware and/or software and may be formed of one hardware component or one software component or a plurality of hardware components or a plurality of software components. The functions (processing) of the image processing apparatuses 10 and 100 may be implemented by a computer 20 including a processor 21 such as a Central Processing Unit (CPU) and a memory 22, which is a storage apparatus, as shown in FIG. 39. For example, a program (image processing program) for performing the method according to the example embodiments may be stored in the memory 22 and each of the functions may be implemented by causing the processor 21 to execute the program stored in the memory 22.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, and semiconductor memories (such as mask ROM, Programmable ROM (PROM), Erasable PROM (EPROM), flash ROM, Random Access Memory (RAM), etc.). Further, the program(s) be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, the present disclosure is not limited to the aforementioned example embodiments and may be changed as appropriate without departing from the spirit of the present disclosure. For example, while skeleton structures of persons have been detected, skeleton structures of animals other than persons (e.g., mammals, reptiles, birds, amphibians, or fish) may instead be detected.

While the present disclosure has been described with reference to the example embodiments, the present disclosure is not limited to the aforementioned example embodiments. Various changes that may be understood by one skilled in the art may be made to the configurations and the details of the present disclosure within the scope of the present disclosure.

The whole or part of the example embodiments disclosed above can be described as, but not limited to, the following supplementary notes.

(Supplementary Note 1)

An image processing apparatus comprising:
  skeleton detection means for detecting two-dimensional skeleton structures of a plurality of persons based on an acquired two-dimensional image;
  feature calculation means for calculating features of the plurality of two-dimensional skeleton structures that have been detected; and
  recognition means for performing processing of recognizing states of the plurality of persons based on a degree of similarity among the plurality of features that have been calculated.

(Supplementary Note 2)

The image processing apparatus according to Supplementary Note 1, wherein the recognition means classifies the states of the plurality of persons as the recognition processing.

(Supplementary Note 3)

The image processing apparatus according to Supplementary Note 2, wherein the recognition means classifies the states of the plurality of persons based on all or some of the features of the two-dimensional skeleton structures.

(Supplementary Note 4)

The image processing apparatus according to Supplementary Note 2, wherein the recognition means classifies the states of the plurality of persons based on a feature of a first part of the two-dimensional skeleton structure and a feature of a second part of the two-dimensional skeleton structure.

(Supplementary Note 5)

The image processing apparatus according to any one of Supplementary Notes 2 to 4, wherein
  the skeleton detection means detects two-dimensional skeleton structures of the plurality of persons from a plurality of two-dimensional images that are continuous in time series, and
  the recognition means classifies the states of the plurality of persons based on the features of the two-dimensional skeleton structures detected from the plurality of two-dimensional images.

(Supplementary Note 6)

The image processing apparatus according to Supplementary Note 5, wherein the recognition means classifies the states of the plurality of persons based on changes in the features of the two-dimensional skeleton structures in the plurality of two-dimensional images.

(Supplementary Note 7)

The image processing apparatus according to any one of Supplementary Notes 2 to 6, wherein the recognition means classifies two-dimensional skeleton structures in which the right side and the left side of a person are opposite from each other as one state.

(Supplementary Note 8)

The image processing apparatus according to any one of Supplementary Notes 2 to 7, wherein the recognition means displays results of classification of the states of the plurality of persons in accordance with the degree of similarity.

(Supplementary Note 9)

The image processing apparatus according to Supplementary Note 8, wherein the recognition means retrieves a state of a person selected from the displayed results of classification from the states of the plurality of persons.

(Supplementary Note 10)

The image processing apparatus according to Supplementary Note 1, wherein the recognition means retrieves, as the recognition processing, a query state from the states of the plurality of persons.

(Supplementary Note 11)

The image processing apparatus according to Supplementary Note 10, wherein the recognition means retrieves the query state based on all or some of the features of the two-dimensional skeleton structures.

(Supplementary Note 12)

The image processing apparatus according to Supplementary Note 10, wherein the recognition means retrieves the query state based on a feature of a first part of the two-dimensional skeleton structure and a feature of a second part of the two-dimensional skeleton structure.

(Supplementary Note 13)

The image processing apparatus according to Supplementary Note 12, wherein the recognition means retrieves the query state based on a weight of the feature of the first part and a weight of the feature of the second part.

(Supplementary Note 14)

The image processing apparatus according to any one of Supplementary Notes 10 to 13, wherein
the skeleton detection means detects two-dimensional skeleton structures of the plurality of persons from a plurality of two-dimensional images that are continuous in time series, and
the recognition means retrieves the query state based on the features of the two-dimensional skeleton structures detected from the plurality of two-dimensional images.

(Supplementary Note 15)

The image processing apparatus according to Supplementary Note 14, wherein the recognition means retrieves the query state based on changes in the features of the two-dimensional skeleton structures in the plurality of two-dimensional images.

(Supplementary Note 16)

The image processing apparatus according to any one of Supplementary Notes 10 to 15, wherein the recognition means retrieves two-dimensional skeleton structures in which the right side and the left side of a person are opposite from each other as one state.

(Supplementary Note 17)

The image processing apparatus according to any one of Supplementary Notes 10 to 16, wherein the recognition means displays results of retrieval of the states of the plurality of persons in accordance with the degree of similarity.

(Supplementary Note 18)

The image processing apparatus according to any one of Supplementary Notes 1 to 17, wherein the feature is a feature of only a height direction of the person.

(Supplementary Note 19)

The image processing apparatus according to Supplementary Note 18, wherein the feature is a feature obtained by normalizing the two-dimensional skeleton structure based on the height of the person when he/she stands upright in a two-dimensional image space.

(Supplementary Note 20)

An image processing method comprising:
detecting two-dimensional skeleton structures of a plurality of persons based on an acquired two-dimensional image;
calculating features of the plurality of two-dimensional skeleton structures that have been detected; and
performing processing of recognizing states of the plurality of persons based on a degree of similarity among the plurality of features that have been calculated.

(Supplementary Note 21)

The image processing method according to Supplementary Note 20, wherein classifying the states of the plurality of persons as the recognition processing.

(Supplementary Note 22)

The image processing method according to Supplementary Note 20, wherein retrieving, as the recognition processing, query states from states of the plurality of persons.

(Supplementary Note 23)

An image processing program for causing a computer to execute processing of:
detecting two-dimensional skeleton structures of a plurality of persons based on an acquired two-dimensional image;
calculating features of the plurality of two-dimensional skeleton structures that have been detected; and
performing processing of recognizing states of the plurality of persons based on a degree of similarity among the plurality of features that have been calculated.

(Supplementary Note 24)

The image processing program according to Supplementary Note 23, comprising classifying the states of the plurality of persons as the recognition processing.

(Supplementary Note 25)

The image processing program according to Supplementary Note 23, comprising retrieving, as the recognition processing, query states from states of the plurality of persons.

REFERENCE SIGNS LIST

1 Image Processing System
10 Image Processing Apparatus
11 Skeleton Detection Unit
12 Feature Calculation Unit
13 Recognition Unit
20 Computer
21 Processor
22 Memory
100 Image Processing Apparatus
101 Image Acquisition Unit
102 Skeleton Structure Detection Unit
103 Feature Calculation Unit
104 Classification Unit
105 Retrieving Unit
106 Input Unit
107 Display Unit
108 Body Height Calculation Unit
110 Database
200 Camera
300, 301 Human Body Model
401 Two-dimensional Skeleton Structure
402 Three-dimensional Human Body Model

What is claimed is:

1. An image processing apparatus comprising:
at least one memory storing instructions, and
at least one processor configured to execute the instructions stored in the at least one memory to:
detect two-dimensional skeleton structures of a plurality of persons based on an acquired two-dimensional image;
calculate features of the plurality of two-dimensional skeleton structures that have been detected;
perform processing of recognizing states of the plurality of persons based on a degree of similarity among the plurality of features that have been calculated;
classify the states of the plurality of persons as the recognition processing; and
classify two-dimensional skeleton structures in which the right side and the left side of a person are opposite from each other as one state.

2. The image processing apparatus according to claim 1, wherein the at least one processor is further configured to execute the instructions stored in the at least one memory to classify the states of the plurality of persons based on all or some of the features of the two-dimensional skeleton structures.

3. The image processing apparatus according to claim 1, wherein the at least one processor is further configured to execute the instructions stored in the at least one memory to classify the states of the plurality of persons based on a feature of a first part of the two-dimensional skeleton structure and a feature of a second part of the two-dimensional skeleton structure.

4. The image processing apparatus according to claim 1, wherein
the at least one processor is further configured to execute the instructions stored in the at least one memory to:
detect two-dimensional skeleton structures of the plurality of persons from a plurality of two-dimensional images that are continuous in time series, and
classify the states of the plurality of persons based on the features of the two-dimensional skeleton structures detected from the plurality of two-dimensional images.

5. The image processing apparatus according to claim 4, wherein the at least one processor is further configured to execute the instructions stored in the at least one memory to classify the states of the plurality of persons based on changes in the features of the two-dimensional skeleton structures in the plurality of two-dimensional images.

6. The image processing apparatus according to claim 1, wherein the at least one processor is further configured to execute the instructions stored in the at least one memory to display results of classification of the states of the plurality of persons in accordance with the degree of similarity.

7. The image processing apparatus according to claim 6, wherein the at least one processor is further configured to execute the instructions stored in the at least one memory to retrieve a state of a person selected from the displayed results of classification from the states of the plurality of persons.

8. The image processing apparatus according to claim 1, wherein the at least one processor is further configured to execute the instructions stored in the at least one memory to retrieve, as the recognition processing, a query state from the states of the plurality of persons.

9. The image processing apparatus according to claim 8, wherein the at least one processor is further configured to execute the instructions stored in the at least one memory to retrieve the query state based on all or some of the features of the two-dimensional skeleton structures.

10. The image processing apparatus according to claim 8, wherein the at least one processor is further configured to execute the instructions stored in the at least one memory to retrieve the query state based on a feature of a first part of the two-dimensional skeleton structure and a feature of a second part of the two-dimensional skeleton structure.

11. The image processing apparatus according to claim 10, wherein the at least one processor is further configured to execute the instructions stored in the at least one memory to retrieve the query state based on a weight of the feature of the first part and a weight of the feature of the second part.

12. The image processing apparatus according to claim 8, wherein
the at least one processor is further configured to execute the instructions stored in the at least one memory to
detect two-dimensional skeleton structures of the plurality of persons from a plurality of two-dimensional images that are continuous in time series, and
retrieve the query state based on the features of the two-dimensional skeleton structures detected from the plurality of two-dimensional images.

13. The image processing apparatus according to claim 12, wherein the at least one processor is further configured to execute the instructions stored in the at least one memory to retrieve the query state based on changes in the features of the two-dimensional skeleton structures in the plurality of two-dimensional images.

14. The image processing apparatus according to claim 8, wherein the at least one processor is further configured to execute the instructions stored in the at least one memory to retrieve two-dimensional skeleton structures in which the right side and the left side of a person are opposite from each other as one state.

15. The image processing apparatus according to claim 8, wherein the at least one processor is further configured to execute the instructions stored in the at least one memory to display results of retrieval of the states of the plurality of persons in accordance with the degree of similarity.

16. The image processing apparatus according to claim 1, wherein the feature is a feature of only a height direction of the person.

17. An image processing method performed by a computer and comprising:
detecting two-dimensional skeleton structures of a plurality of persons based on an acquired two-dimensional image;
calculating features of the plurality of two-dimensional skeleton structures that have been detected;
performing processing of recognizing states of the plurality of persons based on a degree of similarity among the plurality of features that have been calculated;
classifying the states of the plurality of persons as the recognition processing; and
classifying two-dimensional skeleton structures in which the right side and the left side of a person are opposite from each other as one state.

18. A non-transitory computer readable medium storing an image processing program executable by a computer to perform processing comprising:
detecting two-dimensional skeleton structures of a plurality of persons based on an acquired two-dimensional image;
calculating features of the plurality of two-dimensional skeleton structures that have been detected;

performing processing of recognizing states of the plurality of persons based on a degree of similarity among the plurality of features that have been calculated;
classifying the states of the plurality of persons as the recognition processing; and
classifying two-dimensional skeleton structures in which the right side and the left side of a person are opposite from each other as one state.

* * * * *